(12) United States Patent
Hinokuma et al.

(10) Patent No.: US 7,153,608 B2
(45) Date of Patent: *Dec. 26, 2006

(54) IONIC CONDUCTOR, PROCESS FOR PRODUCTION THEREOF, AND ELECTROCHEMICAL DEVICE

(75) Inventors: Koichiro Hinokuma, Kanagawa (JP); Bjoern Pietzak, Kanagawa (JP); Constance Gertrud Rost, Kanagawa (JP); Masafumi Ata, Kanagawa (JP); Yongming Li, Kanagawa (JP); Kazuaki Fukushima, Kanagawa (JP)

(73) Assignee: Sony Corporation, Tokyo (JP)

( * ) Notice: Subject to any disclaimer, the term of this patent is extended or adjusted under 35 U.S.C. 154(b) by 401 days.

This patent is subject to a terminal disclaimer.

(21) Appl. No.: 10/280,941

(22) Filed: Oct. 25, 2002

(65) Prior Publication Data

US 2003/0157388 A1 Aug. 21, 2003

Related U.S. Application Data

(63) Continuation-in-part of application No. 10/171,930, filed on Jun. 14, 2002, now Pat. No. 6,777,133, which is a continuation of application No. 09/619,166, filed on Jul. 19, 2000, now Pat. No. 6,495,290, which is a continuation-in-part of application No. 09/396,866, filed on Sep. 15, 1999, now abandoned.

(30) Foreign Application Priority Data

| Jul. 19, 1999 | (JP) | ............................ H11-204038 |
| Mar. 3, 2000 | (JP) | ........................... P2000-058116 |
| May 29, 2000 | (JP) | ........................... P2000-157509 |
| Jul. 19, 2002 | (JP) | ............................. 2002-210428 |

(51) Int. Cl.
*H01M 4/58* (2006.01)
*H01M 8/10* (2006.01)
*H01M 10/40* (2006.01)
*C08J 5/20* (2006.01)

(52) U.S. Cl. .................. 429/231.8; 429/306; 429/188; 429/324; 429/33; 429/314; 429/317; 521/25

(58) Field of Classification Search ............ 429/231.8, 429/306, 188, 324
See application file for complete search history.

(56) References Cited

U.S. PATENT DOCUMENTS 5,294,732 A * 3/1994 Chiang et al. ................ 560/86

(Continued)

FOREIGN PATENT DOCUMENTS

| JP | 3-167712 | 7/1991 |
| JP | 2000-256007 | 9/2000 |
| WO | WO 01/06519 A1 | 1/2001 |

OTHER PUBLICATIONS

Kawabe et al, Electrochemical properties of fullerene derivative polymers as electrode materials, 1997, Japanese Journal of Applied Physics, Part 2: Letters, 36(8A), L 1055-L 1058.*

(Continued)

*Primary Examiner*—Patrick Joseph Ryan
*Assistant Examiner*—Angela J. Martin
(74) *Attorney, Agent, or Firm*—Bell, Boyd & Lloyd LLC

(57) ABSTRACT

An ionic conductor, such as a proton conductor, a process for production thereof, and an electrochemical device, such as fuel cell, that includes the ionic conductor is provided. The ionic conductor of the present invention is formed from a polymer in which carbon clusters having ion dissociating functional groups are bonded to each other through connecting groups which can also include one or more ion dissociating functional groups. In this regard, the polymer is less water-soluble and more chemically stable than a derivative composed solely of carbon clusters, thus displaying enhanced ionic conduction properties.

39 Claims, 6 Drawing Sheets

SCHEMATIC DIAGRAM SHOWING STRUCTURE OF PROTON CONDUCTING POLYMER IN EXAMPLE 1

U.S. PATENT DOCUMENTS

| | | | |
|---|---|---|---|
| 5,470,680 A | 11/1995 | Loutfy et al. | |
| 6,162,926 A * | 12/2000 | Murphy et al. | 548/417 |
| 6,231,980 B1 | 5/2001 | Cohen et al. | |
| 6,495,290 B1 * | 12/2002 | Hinokuma et al. | 429/231.8 |
| 6,777,133 B1 * | 8/2004 | Hinokuma et al. | 429/231.8 |

OTHER PUBLICATIONS

H.W. Kroto et al; "$C_{60}$: Buckminsterfullerene," Nov. 1985, Nature v. 318, pp. 162-163.

Long Y. Chiang et al, "Multi-hydroxy Additions onto $C_{60}$ Fullerene Molecules," J. Chem. Soc., 1992 pp. 1791-1793.

Long Y. Chiang et al, "Efficient Synthesis of Polyhydroxylated Fullerene Derivatives via Hydrolysis of Polycyclosulfated Precursors," American Chem. Society, 1994, pp. 3960-3969.

C. Park et al, "Further Studies of the Interaction of Hydrogen with Graphite Nanofibers," J. Chem. Society, 1999, pp. 10572-10581.

Shaffer et al., "Dispersion and Packing of Carbon Nanotubes," Carbon, vol. 36, No. 11, pp. 1603-1612 (1998).

* cited by examiner

SCHEMATIC DIAGRAM SHOWING STRUCTURE OF PROTON CONDUCTING POLYMER IN EXAMPLE 1

INFRARED ABSORPTION SPECTRUM OF PROTON CONDUCTING POLYMER IN EXAMPLE 1

(a) SAMPLE A: $-\!\!\!\!+\!\!\!\!\!-C_{60}(CHI_2)_m-CHI\!\!+\!\!\!\!\!-_n$ (b) SAMPLE B: $-\!\!\!\!+\!\!\!\!\!-C_{60}(CH(SO_3Na)_2)_m-CH(SO_3Na)\!\!+\!\!\!\!\!-_n$ (c) SAMPLE C: $-\!\!\!\!+\!\!\!\!\!-C_{60}(CH(SO_3H)_2)_m-CH(SO_3H)\!\!+\!\!\!\!\!-_n$

PARTICLE SIZE DISTRIBUTION OF PROTON CONDUCTING POLYMER IN EXAMPLE 1

EQUIVALENT CIRCUIT OF PROTON CONDUCTOR

SCHEMATIC DIAGRAM SHOWING STRUCTURE OF PROTON CONDUCTING POLYMER REPRESENTED BY THE FORMULA (1)

EXAMPLES OF CARBON CLUSTERS BONDED TO EACH OTHER

IONIC CONDUCTOR, PROCESS FOR PRODUCTION THEREOF, AND ELECTROCHEMICAL DEVICE

CROSS REFERENCE TO RELATED APPLICATIONS

This patent application is a continuation-in-part of U.S. application Ser. No. 10/171,930, filed on Jun. 14, 2002 now U.S. Pat. No. 6,777,133, which is a continuation of U.S. patent application Ser. No. 09/619,166, filed Jul. 19, 2000 now U.S. Pat. No. 6,495,290 which is a continuation-in-part of U.S. application Ser. No. 09/396,866, filed on Sep. 15, 1999 now abandoned, the disclosures of which are herein incorporated by reference.

The present application claims priority to Japanese Patent Application No. H11-204038, filed on Jul. 19, 1999; Japanese Patent Application No. P2000-058116, filed on Mar. 3, 2000; Japanese Patent Application No. P2000-157509, filed on May 29, 2000; and Japanese Patent Application No. P2002-210428, filed on Jul. 19, 2002, the disclosures of which are herein incorporated by reference.

BACKGROUND OF THE INVENTION

The present invention relates to ionic conductors, processes of producing same and devices that include same. More specifically, the present invention relates to an ionic conductor that includes a polymer containing carbon clusters, processes for producing same, and electrochemical devices provided with the ionic conductors.

There is an increasing demand for a high-functional ion-conducting membrane. Particularly, a high-functional protonic conductor is in strong demand in the field of fuel cell.

A fuel cell with a solid electrolyte of proton-conducting membrane is constructed such that the proton-conducting membrane is held between the fuel electrode and the oxygen electrode and electromotive force resulting from reaction between fuel and oxygen is evolved across the fuel electrode and oxygen electrode.

In a fuel cell that consumes hydrogen gas as fuel, hydrogen gas fed to the fuel electrode is oxidized by the reaction shown below to give electrons to the fuel electrode:

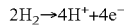

$$2H_2 \rightarrow 4H^+ + 4e^-$$

The resultant hydrogen ions $H^+$ (protons) move or migrate to the oxygen electrode through the proton conducting membrane.

The hydrogen ions that have moved to the oxygen electrode react with oxygen fed to the oxygen electrode, thereby giving rise to water and take electrons from the oxygen electrode, by the reaction shown below:

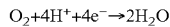

$$O_2 + 4H^+ + 4e^- \rightarrow 2H_2O$$

Fuel cells are attracting attention as a new environment-friendly electric power generator and are being developed in various fields because of their efficient energy conversion (from fuel's chemical energy to electrical energy) and their freedom from emitting environmental pollutants, such as nitrogen oxides.

The fuel cells mentioned above are roughly divided by the kind of proton conductor used therein because their performance (operating temperature and conditions) depends largely on the properties of the proton conductor. Therefore, improvement in the performance of proton conductor is essential to improvement in the performance of fuel cells.

Fuel cells designed to operate at temperatures above normal temperature and lower than 100° C. usually employ a proton-conducting polymeric membrane formed from a solid polymer. Typical examples of such a membrane are Nafion® from DUPONT and GOA membrane from GOA INC., which are made of perfluorosulfonic acid resin. They are still under development. In addition to these known membranes, new proton-conducting polymeric membranes derived from hydrocarbons have recently been reported in academic societies and journals.

Proton conductors which have become known recently are polymolybdic acid ($H_3M_{12}PO_{40} \cdot 29H_2O$, M=Mo or W) and metal oxides (such as $Sb_2O_5 \cdot nH_2O$, n=5.4 in general), both containing water of hydration in large amount. These types of polymeric materials and hydrated compounds exhibit high proton conductivity at or near normal temperatures when they are placed in a moist environment.

In the case of water-containing polymeric material (such as perfluorosulfonic acid resin), proton conductivity manifests itself as the result of protons released from sulfonic acid groups moving through water abundantly present in the polymer matrix. Consequently, in order to maintain high proton conductivity of the perfluorosulfonic acid resin, it is necessary to continuously supply water during operation, thereby keeping the resin sufficiently wet. A proton conductor of inorganic metal oxide also decreases rapidly in proton conductivity in its less moist state.

For this reason, fuel cells that employ a proton conductor as a proton conducting membrane require a humidifier to supply water to gas being fed to fuel cells and auxiliary equipment to control the water content. This makes the system complex and large, which leads to a higher installation cost and operating cost.

Moreover, the disadvantage of the fuel cells that employ a water-containing polymeric material (such as Nafion®) is that the polymeric material keeps water therein such that the water phase is separate from the hydrophobic polymer skeletons. Water in such a state is subject to evaporation at high temperatures and freezing at low temperatures. Consequently, such fuel cells are limited in the range of their operating temperatures, because they need provisions to prevent water from boiling and freezing. In addition, the hydrated state is unstable and dependent largely on temperature, and hence the proton conductivity is greatly affected by temperature and other environmental conditions.

International Patent Publication No. WO 01/06519 A1 discloses a material that exhibits proton conductivity in a dry state. This material is composed mainly of carbon clusters (which have a unique molecular structure, such as $C_{60}$ and $C_{70}$ fullerenes and nanotubes) doped with proton-dissociating groups.

As disclosed, the term "proton-dissociating group" refers to a functional group which permits a hydrogen atom to electrolytically dissociate in the form of proton ($H^+$) and release itself from the group. The term "functional group" refers to not only atomic groups having only one bonding site but also atomic groups having more than one bonding site. The "functional group" may be connected to the end of the molecule or present in the molecule. These definitions shall apply also to the present invention.

The above-mentioned fullerene derivative increases in proton conductivity with the increasing number of proton-dissociating groups introduced into each fullerene molecule. However, as the number of proton-dissociating groups introduced into fullerene molecules increases, the fullerene derivative becomes more water-soluble because the proton-dissociating groups are hydrophilic. When used as an electrolyte of fuel cells, such a water-soluble fullerene derivative would dissolve in water evolved by electrode reactions during power generation.

Thus, there is a tradeoff between imparting high proton conductivity to fullerene derivatives and maintaining the fullerene derivatives to be less soluble in water. Fullerene derivatives as an electrolyte of fuel cells need careful design and material selection regardless of whether or not they are used alone or in combination with other materials.

In addition, fullerene-based proton conductors are mostly in powder form. This can create problems with respect to the production of same into films.

A need therefore exists to provide improved ionic conductors.

SUMMARY OF THE INVENTION

The present invention relates to ionic conductors, processes of producing same and devices that include same. More specifically, the present invention relates to an ionic conductor that includes a polymer containing carbon clusters, processes for producing same, and electrochemical devices provided with the ionic conductors.

In this regard, the present invention provides, for example, an ionic conductor with enhanced ionic conductivity, water resistance, and film-forming properties; a process for producing said improved ionic conductor; and an electrochemical device provided with the improved ionic conductor of the present invention.

In an embodiment, the present invention relates to a proton conductor that includes a carbon cluster derivative including a plurality of functional groups so as to be capable of transferring a plurality of protons between each of the functional groups of the carbon cluster derivative; and a plurality of carbon clusters each including one or more of the functional groups wherein the carbon clusters are bonded together.

In an embodiment, the present invention relates to a proton conductor that includes a polymer including a fullerene structure having one or more proton releasing groups.

In an embodiment, the present invention relates to a proton conductor that includes a polymer including a fullerene structure having one or more proton releasing group wherein the fullerene structure includes a plurality of fullerene molecules bonded together.

In an embodiment, the present invention relates to an ionic conductor which includes a polymer composed of carbon clusters connected to each other through connecting or spacer groups or molecules wherein the carbon clusters have one or more ion-dissociating functional groups.

In an embodiment, the present invention relates to a process for producing said ionic conductor. The process including reacting carbon clusters with connecting molecules having halogen atoms attached to both terminals thereof, thereby synthesizing a carbon cluster polymer having halogen groups introduced thereinto, and substituting said halogen groups with ion dissociating groups.

In an embodiment, the ionic conductor of the present invention contains at least a polymer of carbon clusters represented by the formula (1) below. In an embodiment, the process of the present invention includes a step of forming a polymer of carbon clusters represented by the formula (2) below and a step of introducing ion-dissociating groups into the polymer of carbon clusters. The process of the present invention, in an embodiment, also includes a step of forming a monomer of carbon clusters represented by the formula (3) below and a step of forming a polymer of carbon clusters by a condensation reaction via the monomer.

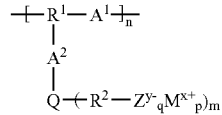

Formula (1)

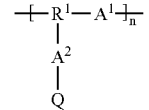

Formula (2)

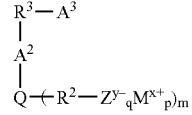

Formula (3)

where $R^1$ includes a hydrocarbon group, a derivative thereof or the like; $A^1$ and $A^2$ includes an element including nitrogen, phosphorus, oxygen, or sulfur or a functional group containing one or more of the elements or the like wherein at least one of $A^1$ and $A^2$ is contained in said polymer; Q includes a residue of carbon cluster or the like; $R^2$ includes a hydrocarbon group, a derivative thereof or the like; $Z^{y-}_q M^{x+}_p$ includes an ion-dissociating group where x, y, p, and q are natural numbers such that px=qy; $M^{x+}$ includes a cation with a valence value of x; m denotes the number of the ion-dissociating groups introduced into each of the carbon cluster residues; n denotes the degree of polymerization; $R^3$ denotes a hydrocarbon group or a derivative thereof; and $A^3$ denotes an element selected from the group consisting of nitrogen, phosphorus, oxygen, or sulfur or a functional group containing said element. It should be appreciated the polymer as defined by Formula 1 and the monomer as defined by Formula 3 may not include the $R^2$ group such that the ion-dissociating group ($-Z^{y-}_q M^{x+}_p$) is bonded directly to the residue (Q) of the carbon cluster.

In an embodiment, the present invention relates to an electrochemical device which includes an electrochemical reaction unit in which the above-mentioned ionic conductor is held between electrodes facing each other.

Applicants have conducted extensive studies to provide ionic materials with improved characteristic properties and stability. In this regard, they have synthesized the above-mentioned polymer in which carbon clusters (as a matrix) are joined together by hydrocarbon groups or derivatives thereof. Although it is essential that the ion-dissociating groups be contained as substituents in the carbon clusters, they may be contained in connecting groups which join carbon clusters together.

The resultant polymer is much less soluble in water and more chemically stable than known materials composed of carbon cluster derivative. In this regard, the carbon cluster can have many of the ion-dissociating functional groups introduced therein with minimal, if any, impact on the water solubility of the material. Thus, the present invention provides an improved ionic conductor capable of conducting ions (such as protons) more efficiently than known materials.

The synthesis of the polymer, in general, involves condensation, substitution and hydrolysis reactions or the like. In an embodiment, the ion-dissociating functional groups should preferably be introduced also into the connecting groups so as to prevent the concentration of the ion-dissociating functional groups from decreasing in the ionic conductor as the result of polymerization. Therefore, the polymer can be produced easily in high yields and thus it permits mass production. According to the present invention, it is possible to produce a water-insoluble ionic conductor with relative ease and at a low cost. In this regard, the use of special materials, handling thereof, processing thereof and the like is not required.

In an embodiment, the present invention provides an electrochemical device that includes the ionic conductor material discussed above. The electrochemical device of the present invention displays an improved and enhanced performance due to the improved ion conducting membrane of the present invention which can act to efficiently conduct ions, such as protons.

Additional features and advantages of the present invention are described in, and will be apparent from, the following Detailed Description of the Invention and the figures.

DETAILED DESCRIPTION OF THE INVENTION

Figure 1:
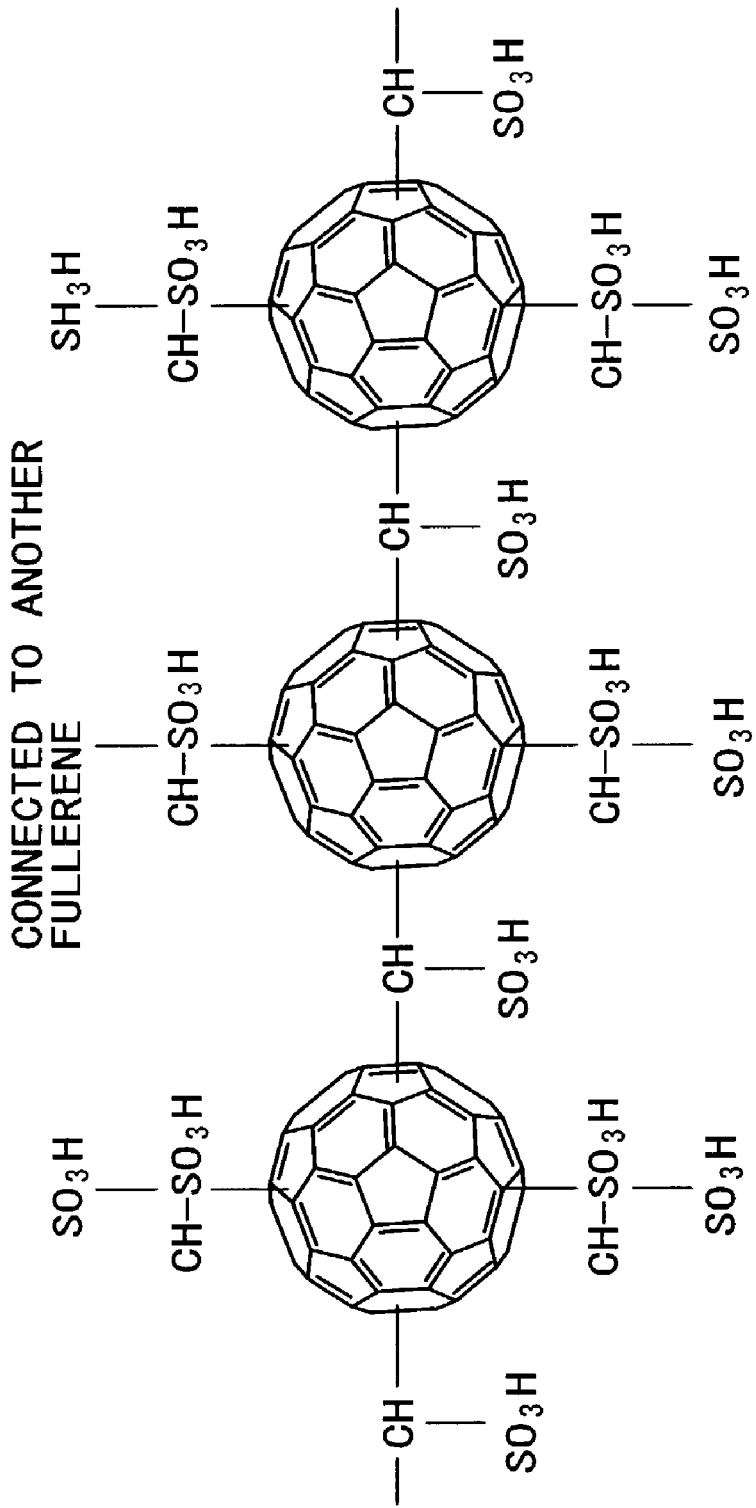
FIG. 1 is a schematic diagram showing the structure of the proton conducting polymer in Example 1 according to an embodiment of the present invention.

The present invention generally relates to ionic conductors, processes of producing same and devices that include same. In particular, the present invention relates to an ionic conductor that includes a polymer containing carbon clusters, processes for producing same, and electrochemical devices provided with the ionic conductors.

In an embodiment, the ionic conductor of the present invention includes connecting groups that have at least one chemical group, such as aliphatic hydrocarbon groups, alicyclic hydrocarbon groups, aromatic hydrocarbon groups, the like, derivatives thereof or combinations thereof.

The connecting groups, in an embodiment, include 1–20 carbon atoms, preferably 1–3 carbon atoms, more preferably one carbon atom. The connecting groups can include a number of variety and suitable chemical groups. In an embodiment, the chemical groups include ion dissociating functional groups, fluorine atoms, the like or combinations thereof.

If the connecting groups contain fluorine atoms, the resulting polymer has improved chemical stability and heat resistance. Moreover, fluorine atoms can promote dissociation of the ion dissociating functional groups because of their high electronegativity (e.g., ability to attract electrons from the surrounding atoms).

The carbon clusters in addition to the connecting groups preferably contain ion dissociating functional groups so that the resulting ionic conductor has improved ionic conductivity due to the functional groups which provide ion sources for ionic conduction.

In general, the connecting group should be short in length to facilitate ionic conduction. In this regard, the shorter the distance between two carbon clusters joined together via a connecting group, the shorter the ionic conduction path and hence the easier the ionic conduction. In addition, as the distance between the ion dissociating group and the carbon cluster decreases, the electron attracting action by fullerenes increases and this can facilitate ion dissociation.

In an embodiment, the ion dissociating group includes, for example, a proton ($H^+$), lithium ion ($Li^+$), sodium ion ($Na^+$), potassium ion ($K^+$), magnesium ion ($Mg^{2+}$), calcium ion ($Ca^{2+}$), strontium ion ($Sr^{2+}$), barium ion ($Ba^{2+}$) and/or the like.

In an embodiment, the ion dissociating group includes a functional group that is a proton dissociating functional group represented by —XH (where X denotes a divalent atom or atomic group). Examples of the functional group of the present invention include hydroxyl group (—OH) and hydroxyl group-containing atomic groups, such as hydrogensulfate ester group (—OSO$_2$OH), sulfonic acid group (—SO$_2$OH), carboxyl group (—COOH), phosphonic acid residue (—PO(OH)$_2$), dihydrogenphosphate ester group (—OPO(OH)$_2$), or the like.

The polymer may contain at least one functional group that includes, for example, bis-sulfonylimide group (—SO$_2$—NH—SO$_2$—), bis-sulfonylmethylene group (—SO$_2$—CH$_2$—SO$_2$—), biscarbonylimide group (—CO—NH—CO—), sulfonylcarbonylimide group (—CO—NH—SO$_2$—) or the like. These types of functional groups display desirable proton-dissociating properties because hydrogen atoms contained therein can be readily released as protons.

The functional groups, in an embodiment, preferably have, at one end or both ends thereof, an electron-attracting functional group, such as —CX$_2$—, —CX$_3$ or the like where X denotes a halogen atom excluding when —CX$_3$ is attached to both ends. The halogen atom preferably includes a fluorine atom, which attracts electrons from the surrounding atoms because of its strong electronegativity and hence helps the ion dissociating group to dissociate.

It should be appreciated that the functional group can act as a proton dissociating group as previously discussed. In another state in which the protons are replaced by other cations (such as lithium ions), the functional group can function as an ionic conductor for the cations. The functional groups may be contained in the connecting group or connected to the carbon cluster so long as they are present in any of said polymers.

In addition, the carbon clusters in an embodiment include spherical carbon cluster molecules $C_n$ (where n=36, 60, 70, 76, 78, 80, 82, 84, or the like) An example is a $C_{60}$ fullerene molecule which has 30 double bonds or 60 π electrons. Because of its strong electron attracting force, it enhances the degree of proton dissociation of the proton dissociating group to such an extent that proton dissociation takes place even in a dry state. This produces high proton conductivity.

As used herein, the term "cluster" implies an aggregate consisting of several to hundreds of atoms bonding together. As used herein, the term "carbon cluster" denotes a cluster composed mainly of carbon atoms, with the number of carbon atoms ranging from several to hundreds, in which the carbon-carbon bonding may take on any form. In other words, the carbon cluster is not necessarily composed entirely of carbon atoms. In this regard, it can also include an aggregate of carbon atoms containing some atoms other than carbon.

It should be appreciated that the carbon cluster is not limited to a spherical carbon cluster molecule. For example, the carbon cluster may have a cage-like structure, an open-end structure and/or the like. Examples of carbon clusters include carbon nanotubes, carbon nanofibers, fine particles having a diamond structure and/or the like.

In an embodiment, the carbon cluster includes at least one electron attracting functional group, such as nitro group ($-NO_2$), carbonyl group ($-CO-$), carboxyl group ($-COOH$), nitrile group ($-CN$), halogenated alkyl group, halogen group, the like or combinations thereof. This can facilitate the dissociative properties of the ion dissociating functional group and thus the ion conductive properties of the present invention.

The polymer may be mixed with a binder to form the ionic conductor. The binder can include, for example, at least one type of binder material, such as polyfluoroethylene, polyvinylidene fluoride, polyvinyl alcohol and/or the like. If mixed with the polymer, the binder can improve the film forming properties of the polymer. The binder should be formed from a material with a low electron conductivity; otherwise, it will cause short-circuiting between the fuel electrode and the oxygen electrode in the resulting fuel cell.

As previously discussed, the present invention provides a process of producing an ionic conductor. In an embodiment, the process includes forming an ionic conductor with a halogen group that includes, for example, at least one species of bromine, chlorine, preferably iodine and/or the like.

In an embodiment, the ionic conductor is defined by the formula as discussed. The $R^1$ and $R^2$ groups preferably have 1 to 20 carbon atoms. The $M^{x+}$ group includes a proton ($H^+$), lithium ion ($Li^+$), sodium ion ($Na^+$), potassium ion ($K^+$), magnesium ion ($Mg^{2+}$), calcium ion ($Ca^{2+}$), strontium ion ($Sr^{2+}$), barium ion ($Ba^{2+}$) or the like. The $Z^{y-}$ includes at least one anion, such as sulfonic acid group ($-SO_3^-$), bis-sulfonylimide group ($-SO_2-N^{-SO_2}-$), hydrogensulfate ester group ($-OSO_3^-$), carboxyl group ($-COO^-$), sulfoneamide group ($-SO_2NH^--$), phosphonic acid residue ($-PO_3^{2-}$), dihydrogenphosphate ester ($-OPO_3^{2-}$) and/or the like.

In addition, the polymer preferably includes at least one functional group, such as bis-sulfonylimide group ($-SO_2-NH-SO_2-$), bis-sulfonylmethylene group ($-SO_2-CH_2-SO_2-$), bis-carbonylimide group ($-CO-NH-CO-$), and sulfonylcarbonylimide group ($-CO-NH-SO_2-$) or the like. These types of functional groups display enhanced proton dissociating properties because they contain hydrogen atoms that can be readily released as protons.

The functional group preferably has, at one end or both ends thereof, an electron attracting functional group, such as $-CX_2-$ and $-CX_3$ where X denotes a halogen atom expect where $-CX_3$ is attached to both ends. The halogen atom of the electron attracting functional group preferably includes a fluorine atom, which attracts electrons from the surrounding atoms because of its strong electronegativity and hence facilitates the dissociative properties of the ion dissociating group to dissociate.

The functional group is a proton dissociating group in the above-mentioned state; However, in another state in which the protons can be replaced by other cations (such as lithium ions), it can function as an ionic conductor with respect to the other types of cations. It should be appreciated that the functional groups may be contained in the molecule chain of the polymer or connected to the carbon cluster so long as they are present in any of the polymers.

In addition, the carbon clusters in an embodiment are spherical carbon cluster molecules $C_n$ where n=36, 60, 70, 76, 78, 80, 82, 84, and/or the like, preferably $C_{60}$ and/or $C_{70}$. An example is a $C_{60}$ fullerene molecule which has 30 double bonds or 60 π electrons. Because of its strong electron attracting force, it enhances the degree of proton dissociation of the proton dissociating group to such an extent that proton dissociation takes place even in a dry state. This produces high proton conductivity.

The cluster implies an aggregate consisting of several to hundreds of atoms bonding together. The carbon cluster denotes a cluster composed mainly of carbon atoms, with the number of carbon atoms ranging from several to hundreds, in which the carbon-carbon bonding may take on any form. In other words, the carbon cluster is not necessarily composed entirely of carbon atoms but it also includes an aggregate of carbon atoms containing atoms other than carbon.

The carbon cluster is not limited to spherical carbon cluster molecule; it may have a cage-like structure, an open-end structure or the like. It can include carbon nanotubes, carbon nanofibers, fine particles of diamond structure and/or the like.

In addition, the carbon cluster should preferably be one which has at least one electron attracting functional group, such as nitro group ($-NO_2$), carbonyl group ($-CO-$), carboxyl group ($-COOH$), nitrile group ($-CN$), halogenated alkyl group, halogen group and/or the like. This can enhance the dissociative properties of the ion dissociating functional group.

In an embodiment, the carbon cluster contains no less than 5 mass % of the carbon cluster residue. The carbon cluster in an embodiment includes the $R^1$ and/or $R^2$ groups having at least one chemical group, such as aliphatic hydrocarbon groups, alicyclic hydrocarbon groups, aromatic hydrocarbon groups, the like or derivatives thereof, and also have at least one functional group, such as nitrogen (N), oxygen (O), phosphorus (P), sulfur (S), fluorine (F), chlorine (Cl), bromine (Br), iodine (I) and/or the like.

In an embodiment, the carbon cluster is synthesized from a precursor polymer having a molecular weight of about 1,000 to about 5,000,000.

The carbon cluster in an embodiment is synthesized from a monomer containing said carbon cluster residue by homopolymerization or copolymerization with another monomer. Said copolymerization includes alternating copolymerization, block copolymerization, random copolymerization or the like.

The carbon cluster can have a partly crosslinked structure formed by irradiation with light, by radical reaction induced by a radial initiator, or by reaction with a crosslinking agent with a sulfonylhalide group or hydroxyl group in said polymer. The crosslinking agent can include, for example, polyisocyanate, dihalogen, epoxy, diazide, dicarboxylic acid, bistrimethylsilylamide and/or the like.

In an embodiment, the carbon cluster is formed by gelling said polymer with a gelling agent, such as propylene carbonate, ethylene carbonate, dimethoxyethane and/or the like.

The carbon cluster in an embodiment is formed by casting from the polymer and a binder, such as polycarbonate, polyvinylidene fluoride, polyphenylene oxide and/or other suitable binder.

The process for production of an ionic conductor in an embodiment includes the carbon cluster polymer represented by the formula (2) above is synthesized by introducing an azide group (—$N_3$) into a polymer composed of $R^1$ and $A^1$ (as defined above) and reacting the azide group with the carbon clusters.

In an embodiment, the process includes the carbon cluster polymer represented by the formula (2) synthesized by condensation reaction of monomer containing the carbon clusters of the present invention.

The electrochemical device can be used in a number of suitable application, such as to construct fuel cells.

The ion dissociating functional groups used in the present invention can include monovalent chemical groups, such as hydrogen sulfate ester group (—$OSO_2OH$) and sulfonic acid group (—$SO_2OH$), divalent chemical groups, such as bis-sulfonylamide (—$SO_2$—NH—$SO_2$—), and/or the like.

These functional groups can be introduced by a typical organic chemical process. For example, hydrogensulfate ester group (—$OSO_2OH$) is introduced by treating fullerene with fumic sulfuric acid. Also, introduction of sulfonic acid group (—$SO_2OH$) is accomplished by substitution of halogen group, such as iodine (I), with hydrogensulfite ion, or by hydrolysis of sulfochloride group (—$SO_2Cl$) or sulfonylfluoride group (—$SO_2F$) as described in detail below.

Introduction of strongly dissociating bis-sulfonylimide group (—$SO_2$—NH—$SO_2$—) may be accomplished by the process mentioned in Journal of Fluorine Chemistry (1995), 72, p. 203–208. The reaction scheme is shown below (where, R denotes an arbitrary hydrocarbon group or a derivative thereof).

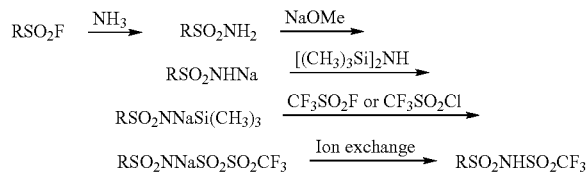

The reaction starts with conversion of a compound having a sulfonylfluoride group (—$SO_2F$) into sulfoneamide with liquid ammonia. Then this sulfoneamide is converted into sulfoneamide sodium salt by the action of sodium methoxide. This sodium salt is reacted with hexamethylsilazane to give a bis-sulfonylimide precursor. The resulting precursor is reacted with trifluoromethylsulfonyl halide to give bis-sulfonylamide having a terminal trifluoromethyl group.

EXAMPLES

The present invention will be described in more detail with reference to the following preferred embodiments of the ionic conductor and the process for production thereof.

Example 1

(Polymer of fullerene as a proton conductor and a process for production thereof)

The following describes the synthesis and structure of a polymer of fullerene as a proton conductor containing fullerene in the polymer main chain, along with the measurement of particle diameter and proton conductivity.

Synthesis of Polymer as a Proton Conductor

A polymer of fullerene as a proton conductor was synthesized in the following manner from $C_{60}$ fullerene (as carbon clusters), $I(CH_2)_kI$ (as connecting molecules), and sulfonic acid groups (as ion dissociating functional groups).

The connecting molecule $I(CH_2)_kI$ combines with a $C_{60}$ fullerene through one of its two iodine atoms as follows.

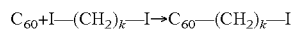

The residue (—$(CH_2)_k$—I) of the connecting molecule combines with another $C_{60}$ fullerene through its remaining iodine atom to form a molecular chain as the polymer skeleton includes two fullerenes joining to each other through a methylene chain.

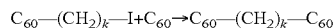

The residue of the connecting molecule may stay on the fullerene, with its one iodine atom remaining unreacted. In this case, the iodine group is replaced by a proton dissociating group such as sulfonic acid group.

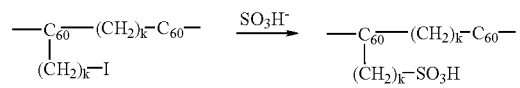

The synthesis of the polymer of fullerene as a proton conductor can be carried out by a typical condensation reaction and substitution reaction as mentioned above. Therefore, the process in Example 1 can be practiced with relative ease, thus making it suitable for mass production with high yields. Moreover, the process in Example 1 permits a water-insoluble proton conductor to be produced at a lower production cost than the conventional process which may require the use of specialty-type fullerenes and/or additional process steps to make the resultant material water-insoluble.

The following reaction scheme illustrates a polymer of fullerene as a proton conductor which is produced by using iodoform ($CHI_3$) as a connecting molecule according to the reaction scheme shown below. Since iodoform ($CHI_3$) has three iodine atoms, the third iodine atom permits a proton dissociating group to be introduced also into the connecting group. This leads to improved proton conductivity. Although similar reactions are possible with chloroform or bromoform, iodoform is most desirable.

Step 1

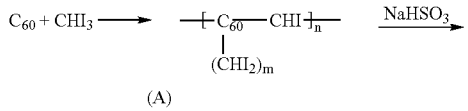

(A)

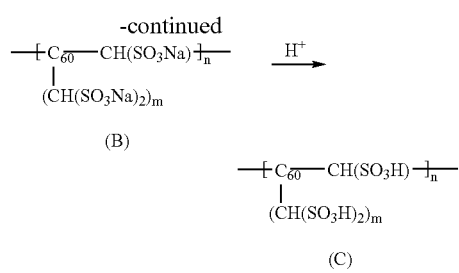

(B)

(C)

In a three-neck flask was placed 1 g (1.39 mmol) of fullerene $C_{60}$. The flask received about 150 mL of 1,2-dimethoxyethane (DME), with air and moisture therein completely replaced by dry nitrogen. A previously prepared DME solution containing sodium naphthalenide (40-fold equivalent of fullerene) was added slowly through a cannula. The contents of the flask were stirred for 2 hours. Sodium naphthalenide is a catalyst which functions as an electron supply source.

Then, a DME solution containing iodoform ($CHI_3$) (20-fold equivalent of fullerene) was added dropwise, with the flask cooled in a water bath. The contents of the flask were stirred for about 1 to about 24 hours at a suitable temperature, such as room temperature or 80° C., so that reaction between fullerene and iodoform took place. As the reaction proceeded, the solution turned from green to dark brown. After the reaction, the solution was filtered with suction to separate the polymerized solid product, which was thoroughly washed with methanol and toluene. Thus, there was obtained 2.88 g of sample A, which is a precursor (—[—$C_{60}(CHI_2)_m$—CHI—$]_n$—) of a polymer of fullerene as a proton conductor.

Step 2

To begin with, 1 g of sample A was dispersed in 50 mL of N-methylpyrrolidone (NMP). To the dispersion cooled in a water bath was added dropwise 50 mL of aqueous solution containing 15.12 g of sodium hydrogensulfite ($NaHSO_3$). Then, the resulting solution was stirred for about 1 to about 72 hours at a suitable temperature, such as room temperature or 80° C. so that sulfonic acid groups were introduced into sample A. After the reaction was complete, the solution was filtered with suction to separate sample B (—[—$C_{60}$(CH ($SO_3Na)_2)_m$—CH($SO_3Na$)—$]_n$—) which has sulfonic acid groups introduced thereinto. After washing with water and drying at 60° C., there was obtained 0.72 g of sample B.

To 1 g of sample B was added 1 M solution of hydrochloric acid. The resulting solution was stirred for about 1 to about 18 hours at room temperature so that sodium ions ($Na^+$) in sample B were replaced by hydrogen ions ($H^+$). In this way there was obtained sample C (—[—$C_{60}$(CH($SO_3H$) $_2)_m$—CH($SO_3H$)—$]_n$—), which is a polymer of fullerene as a proton conductor. Sample C was filtered off from the reaction liquid, washed with 0.1 M solution of dilute hydrochloric acid, and finally with water. The collected solids were dried after it had been confirmed that no chloride ions ($Cl^-$) were detected in the washings by reaction with a 1 M aqueous solution of silver nitrate ($AgNO_3$). Thus, there was obtained 0.8 g of sample C.

Structure of Polymer of Fullerene as a Proton Conductor

FIG. 1 shows the structure of the polymer of fullerene as a proton conductor.

One fullerene binds to its adjacent ones through a connecting group (—CH($SO_3H$)—) which is a methylene group substituted with a sulfonic acid group (—$SO_3H$). This connecting group is referred to as a substituted methylene group hereinafter. The fullerenes connected together form the polymer skeleton. If one fullerene has two substituted methylene groups, the resulting polymer assumes a simple chain structure in which molecular chains extend in two directions. If one fullerene has three or more substituted methylene groups, the resulting polymer assumes a branched structure in which molecular chains extend in three or more directions. Assuming that one fullerene has l substituted methylene groups on average, then the polymer having a value of l larger than 2 is not a simple chainlike molecule but a molecule having a three-dimensional structure. In this way the value of l is closely related with the structure of the polymer skeleton.

On the other hand, the polymer of fullerene as a proton conductor exists also in the form of separate fullerenes which do not bind to each other, and each fullerene merely has one or more substituent groups which are methyl groups substituted with a sulfonic acid group (—$SO_3H$). This substituent group is referred to as a substituted methyl group hereinafter. Assuming that one fullerene has m substituted methyl groups on average, then these substituted methyl groups function as a proton source which is not related with the structure of the polymer skeleton.

The values of l and m can be controlled by adjusting the temperature and time of synthesis or adjusting the molar ratio of fullerene to other raw materials. The larger is the value of l, the less the resulting polymer is soluble in water due to the branched structure. By contrast, the larger is the value of m and the larger is the number of sulfonic acid groups per fullerene, the higher is the proton conductivity due to the increased number of protons. Since the values of l and m can be controlled independently, it is possible to reconcile water insolubility and high proton conductivity.

Figure 2:
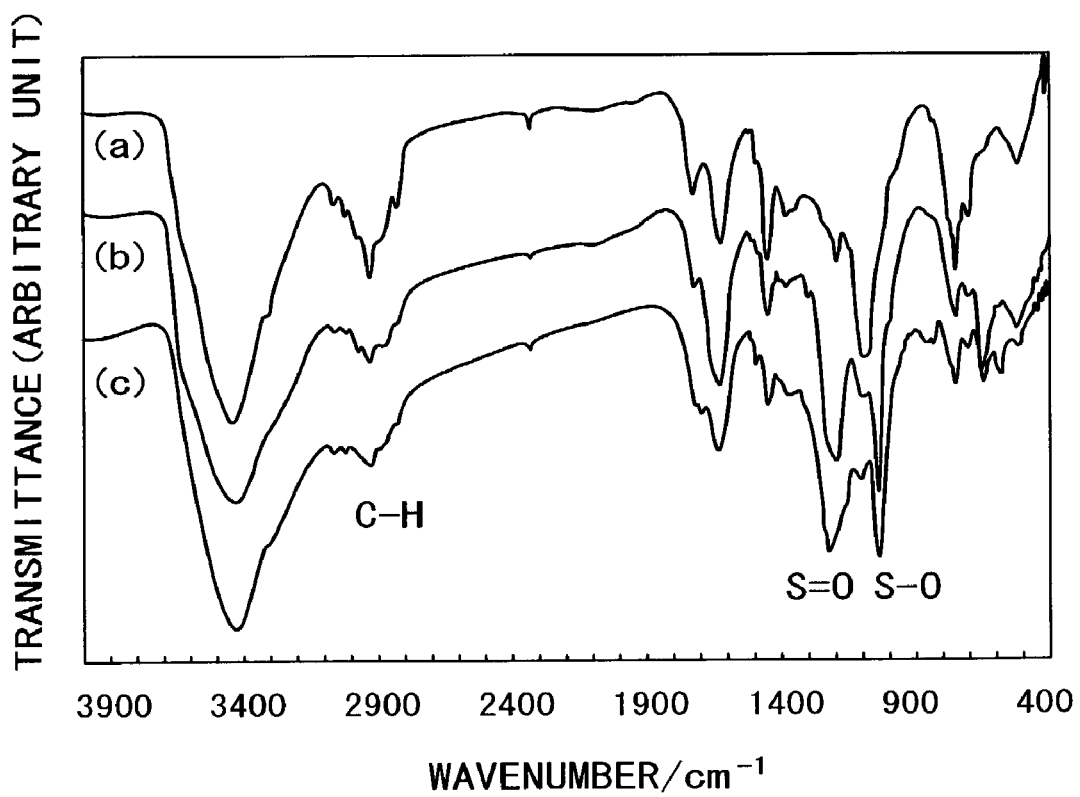
FIG. 2 is an infrared absorption spectrum of the proton conducting polymer in Example 1 according to an embodiment of the present invention.

FIG. 2 shows the infrared absorption spectra [(a), (b), and (c)] of samples A, B, and C, which were measured by the KBr method using an FT-IR apparatus. The spectrum (a) has several peaks at 2826, 2889, 2927, 2971, 3001, and 3060 $cm^{-1}$, which are attributed to the stretching vibration of C—H bond in Sample A. The fact that the absorption due to the stretching vibration of C—H bond suggests that the bond energy slightly changes depending on the environment in which the C—H bond is placed. The foregoing indicates the polymerization of a large number of fullerenes. The spectrum (a) has a strong peak at 1100 $cm^{-1}$ which is probably due to stretching vibration of the C—I bond.

The spectra (b) and (c) of samples B and C do not have the peak due to stretching vibration of the C—I bond but have peaks at 1218 and 1045 $cm^{-1}$, which are due to stretching vibration of the S=O bond and S—O bond, respectively. This suggests that sulfonic acid groups have been introduced successfully.

Particle Diameter of Polymer of Fullerene as a Proton Conductor

Samples A and C (50 mg each dispersed in 10 mL of NMP) were measured for the particle diameter of polymer by the laser scattering method at room temperature. Sample A was prepared by polymerization reaction at 80° C. for 18 hours. Sample C was prepared by introducing sulfonic acid groups into Sample A at 80° C. for 72 hours.

Figure 3:
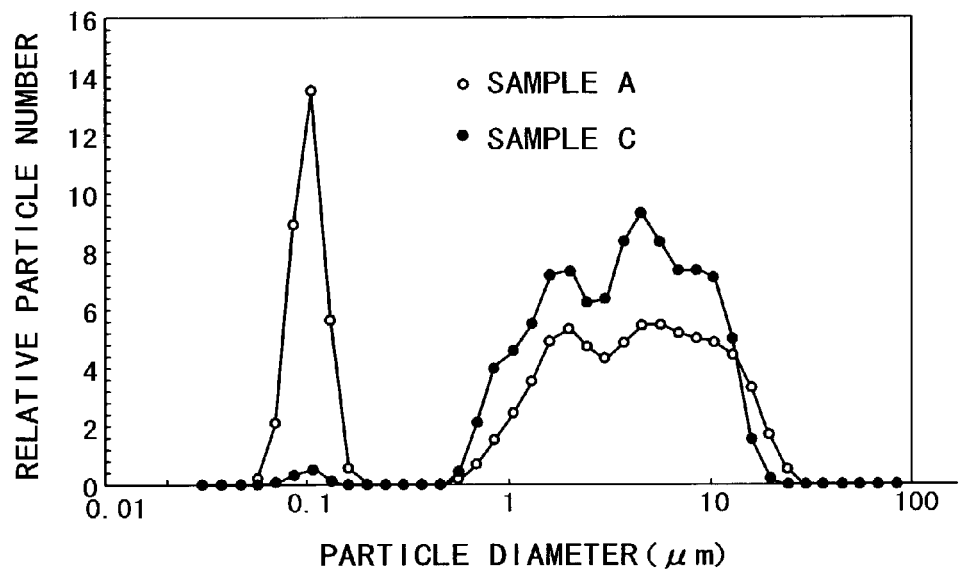
FIG. 3 is a diagram showing the particle size distribution of the proton conducting polymer in Example 1 according to an embodiment of the present invention.

FIG. 3 is a graph showing the particle size distribution of polymer of samples A and C. White circles denote the relation between the relative particle number of the polymer and the particle diameter of the polymer. It is noted that there are two peaks in the particle size distribution. Presumably, the sharp peak at about 0.1 µm corresponds to comparatively small polymer particles thoroughly dispersed in the solvent. By contrast, the broad peak extending from about 1 µm to about 10 µm corresponds to large polymer particles which do not disperse but aggregate.

Black circles denote the relation between the relative particle number of the polymer and the particle diameter of the polymer in sample C. There are two noteworthy features which are not found in the graph of sample A.

First, the peak in the vicinity of about 0.1 µm is extremely small. A probable reason for this is that the polymer of sample C is liable to aggregation on account of highly polar sulfonic acid groups introduced thereinto and the polymer mostly has grown into large particles (about 1 µm to about 10 µm).

Second, the particles of sample C in the region from about 1 µm to about 10 µm have almost the same size as those of sample A. This implies that introduction of sulfonic acid groups into the polymer of sample A does not appreciably change the particle size and also suggests that the polymer is stable owing to strong bonds between fullerenes through the substituted methylene groups.

It is noted that one particle with a particle diameter of about 0.1 µm is composed of approximately tens to hundreds of thousands of fullerenes in the form of stable water-insoluble polymer.

[Pelletizing of polymer of fullerene as a proton conductor, and measurement of proton conductivity]

Sample C (in powder form) in Example 1 was pressed in one direction to make into a round pellet measuring 4 mm in diameter and 1.3 mm thick. Pelletizing was easily accomplished without a binder resin because of good moldability.

The resulting pellet, held between gold electrodes, was measured for proton conductivity (in terms of complex impedance $Z=Z_{re}+i.Z_{Im}$) at different frequencies ranging from 1 Hz to 7 MHz (with an amplitude of 0.1 V). This measurement was carried out in the air without humidification.

Figure 4:
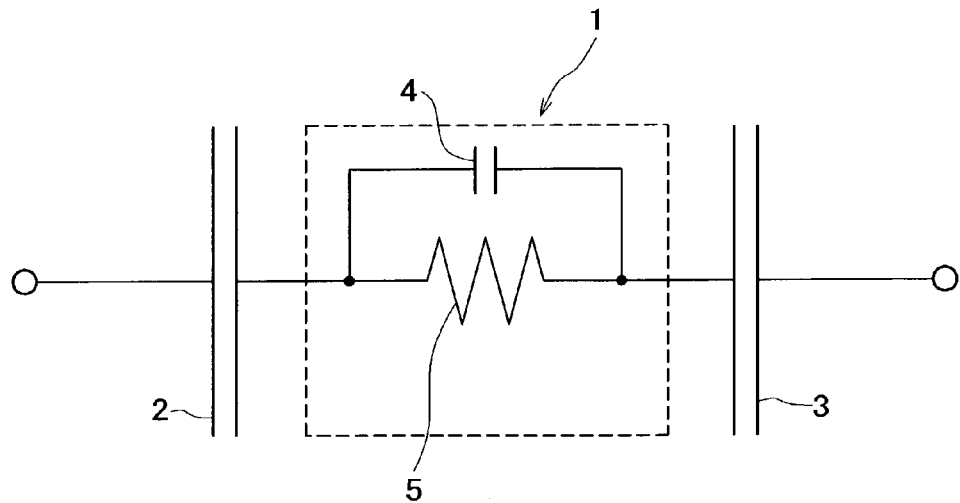
FIG. 4 is a schematic diagram showing an equivalent circuit of a proton conducting polymer in Example 1 according to an embodiment of the present invention.

The assembly for impedance measurement is regarded as constituting an equivalent circuit (shown in FIG. 4) which includes a proton conductor 1, electrodes 2 and 3, and capacitance 4 and resistance 5 in parallel. It should be appreciated that the capacitance 4 represents the delay (phase lag at high frequencies) induced by moving protons, and the resistance 5 represents the ease with which protons move.

Figure 5:
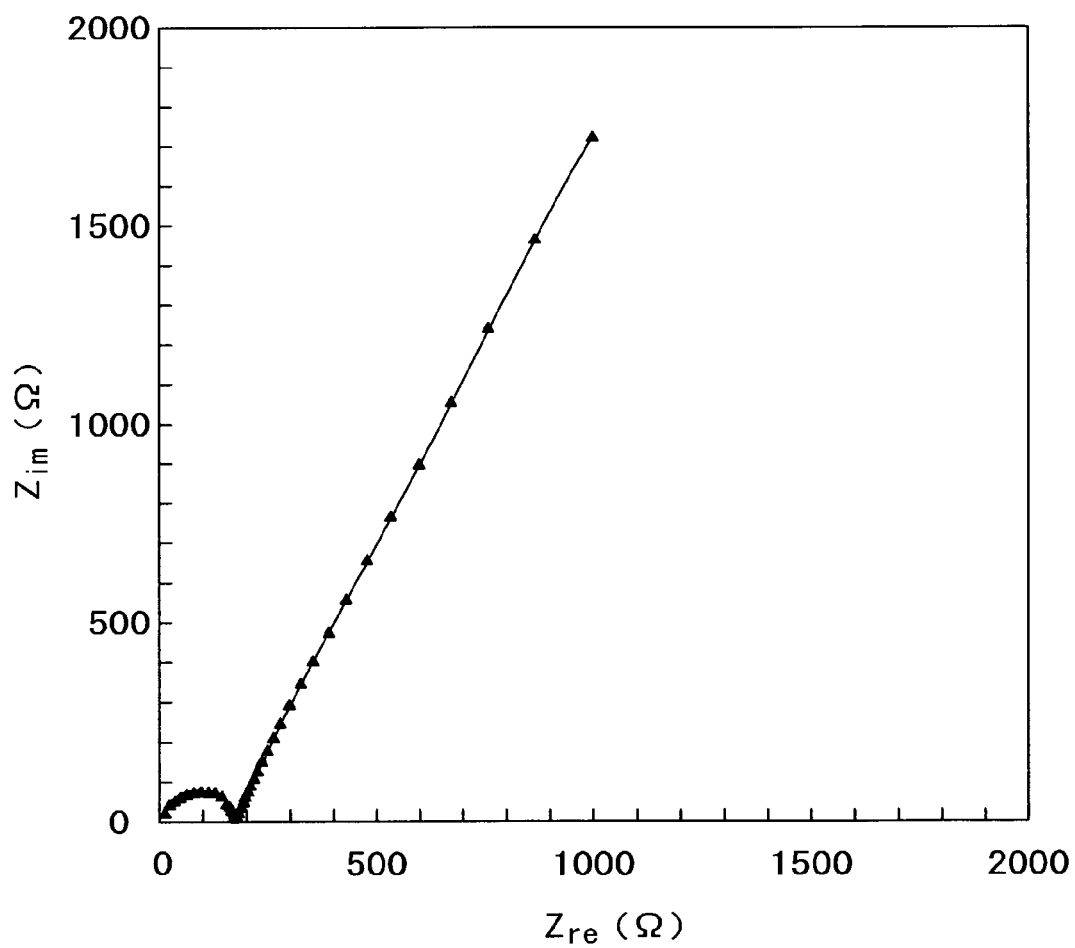
FIG. 5 is a graph showing the proton conductivity (complex impedance) of the proton conducting polymer in Example 1 according to an embodiment of the present invention.

The ac resistance was obtained from the x-intercept of the cole-cole plots shown in FIG. 5. The proton conductivity calculated from the resistance was $6.2 \times 10^{-3}$ S cm$^{-1}$.

Examples 2 to 9

(Various polymers of fullerene as a proton conductor and their ionic conductivity)

The following describes the synthesis of a polymer of fullerene as a proton conductor containing fullerene in the polymer side chains, along with the measurement of their ionic conductivity.

Example 2

A styrene-sulfonated azahomofullarenostyrene copolymer was synthesized according to the following reaction flow diagram.

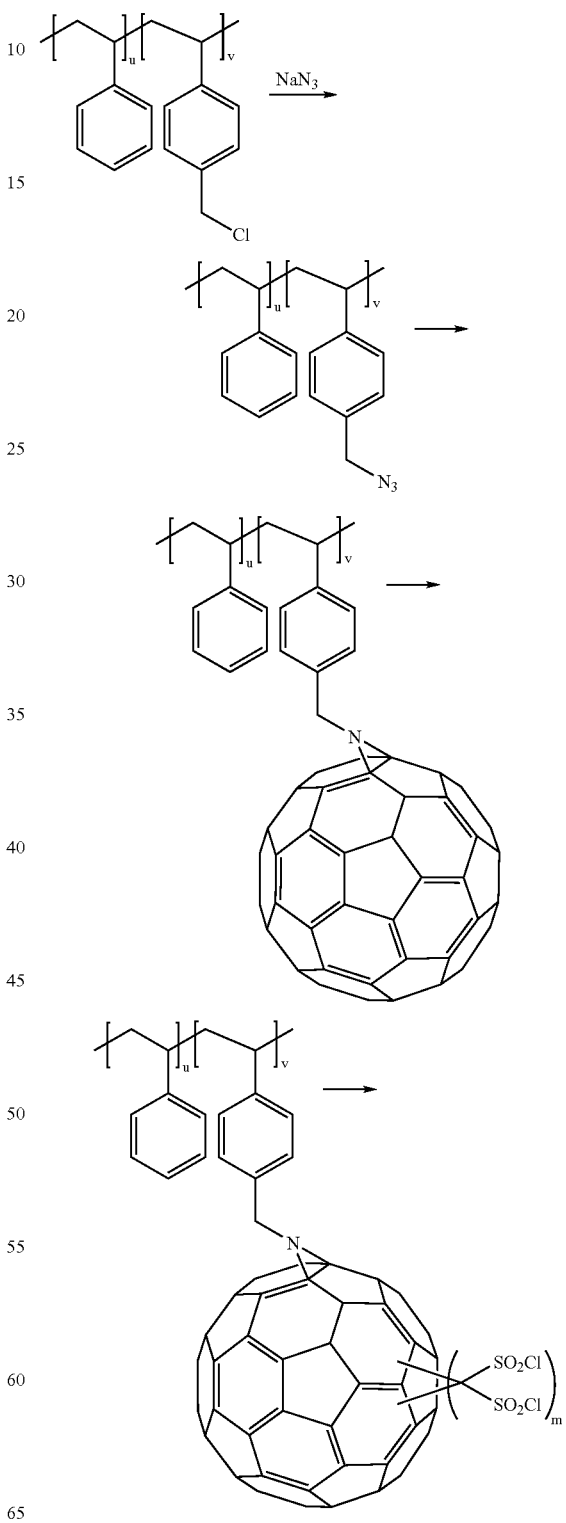

-continued

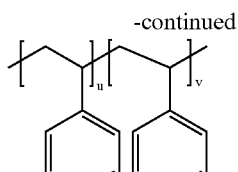

In 100 mL of tetrahydrofuran was dissolved 0.5 g of styrene-p-(chloromethyl)styrene copolymer having a molecular weight of 46200 (in which p-(chloromethyl) styrene accounts for 18.2 mol %). To the resulting solution was added 0.29 g of sodium azide. After stirring for one day, the resulting styrene-p-(azidemethyl)styrene copolymer (0.45 g) was extracted with tetrahydrofuran.

The styrene-p-(azidemethyl)styrene copolymer (0.4 g) was dissolved in 100 mL of chlorobenzene. This solution was added dropwise with stirring to 300 mL of chlorobenzene solution containing 2.5 g of fullerene. With vapor refluxed, the solution was heated at 140° C. (boiling point) for 16 hours. The reaction was suspended when the peak (at 2095 cm$^{-1}$) due to azide groups disappeared in the infrared spectrum. The reaction product was separated from unreacted fullerene by dissolution in tetrahydrofuran. Thus, there was obtained 0.6 g of styrene-azahomofullarenostyrene copolymer, which contains 34% fullerene.

In 100 mL of tetrahydrofuran were dissolved 0.2 g of styrene-azahomofullarenostyrene copolymer, 0.34 g of sodium hydride, and 0.24 g of iodine. To the resulting solution was added dropwise 0.15 g of methane disulfonylchloride $CH_2(SO_2Cl)_2$, and the solution was kept at 60° C. for 100 hours in an atmosphere of argon for reaction to proceed. After the reaction was complete, ethanol was added and the reaction product was concentrated to dryness. In this way fullerene residues had bis(chlorosulfonyl)methano group (—$C(SO_2Cl)_2$—) introduced thereinto.

The resulting product was hydrolyzed with water so that sulfochloride group (—$SO_2Cl$) was converted into sodium salt of sulfonic acid group. The hydrolyzate was freed of salts having a small formula weight with the aid of permeable membrane. Thus there was obtained a purified copolymer (in the form of sodium salt) of styrene and sulfonated azahomofullarenostyrene. This copolymer was treated with ion exchange resin or 10% hydrochloric acid so that sodium ions were replaced by protons. Thus there was obtained 0.18 g of styrene-sulfonated azahomofullarenostyrene copolymer.

This sample was dissolved in dimethylformamide and the resulting solution was cast onto a gold electrode. After drying at 50° C. for 24 hours, there was obtained a desired film.

Example 3

Sulfonated azahomofullarenopolyphenyleneoxide was synthesized according to the following reaction flow diagram.

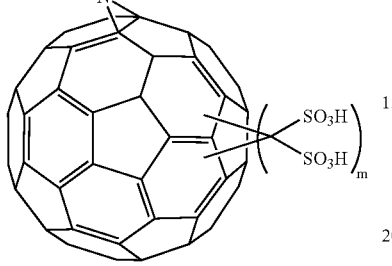
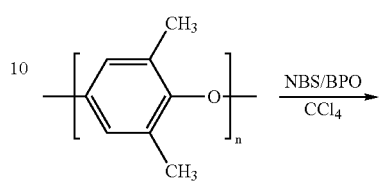
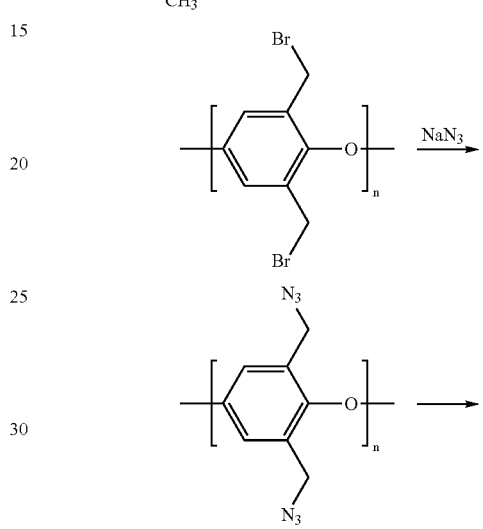
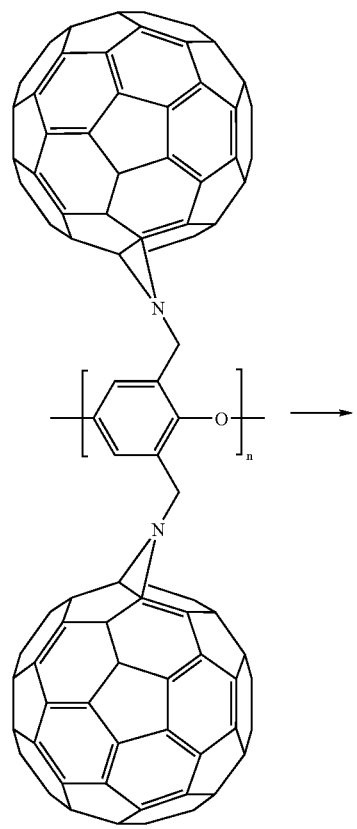

-continued

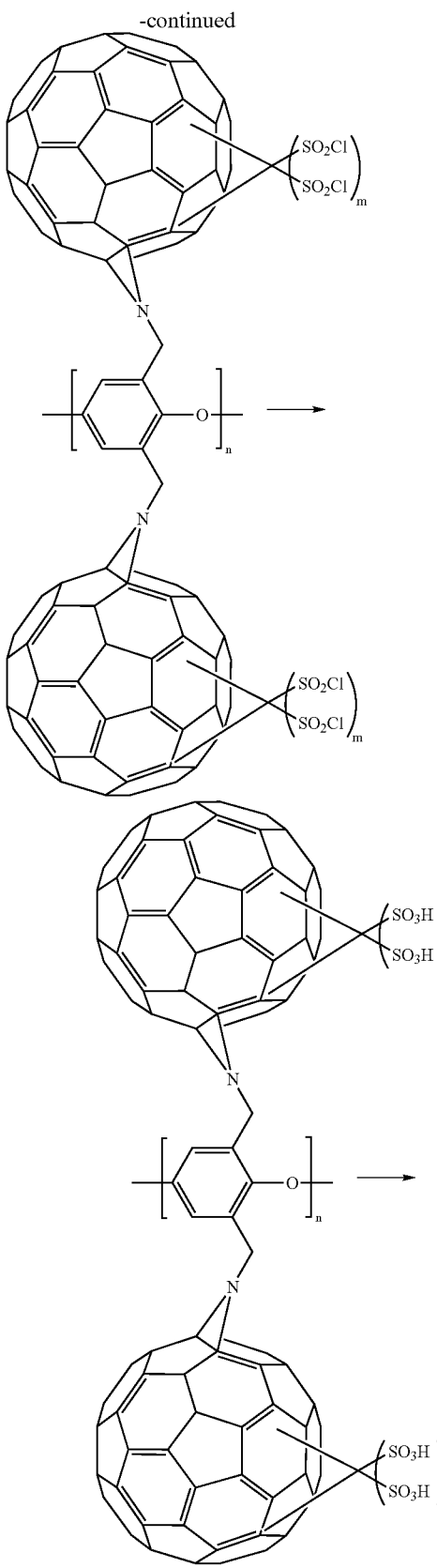

In 1.2 L of carbon tetrachloride were dissolved 7 g of poly(2,6-dimethyl-1,4-phenyleneoxide) (PPO), 1.5 g of N-bromosuccineimide (NBS), and 0.3 g of benzoyl peroxide (BPO). With vapor refluxed, the solution was heated at 77° C. (boiling point) for 5 hours. After the reaction was complete, NBS was filtered off. The filtrate (ice cooled) was added to methanol so as to precipitate PPO which had its methyl groups brominated (this precipitate is referred to as brominated PPO hereinafter). The brominated PPO was dissolved in chloroform and the resulting solution was added to methanol for reprecipitation. The steps of dissolution and reprecipitation were repeated several times to remove impurities. Thus, there was obtained 5 g of purified brominated PPO.

In 120 mL of mixed solvent of toluene and dimethylsulfoxide (3:1 by volume) were dissolved 2 g of brominated PPO and 0.3 g of sodium azide. Reaction was continued at 50° C. for 2 days. After the reaction was complete, the reaction liquid was added dropwise to methanol so as to precipitate PPO which had azide group (—$N_3$) introduced into its methyl groups (this precipitate is referred to as azidized-PPO hereinafter). The azidized-PPO underwent dissolution in chloroform and reprecipitation from methanol several times. Thus there was obtained 5 g of purified azidized-PPO (with 6.2 mol % azidized).

In 120 mL of chlorobenzene were dissolved 2.0 g of azidized-PPO and 0.33 g of fullerene. With vapor refluxed, the solution was heated at 80° C. (boiling point) in an atmosphere of nitrogen until the peak at 2095 cm$^{-1}$ in infrared spectrum due to azide groups disappeared. The reaction product was dissolved in chloroform to remove unreacted fullerene. Thus there was obtained PPO into which about 50 mass % of fullerene had been introduced. (This product is referred to as fullerene PPO hereinafter.)

In 100 mL of tetrahydrofuran were dissolved 0.2 g of fullerene PPO, 0.5 g of sodium hydride, and 0.35 g of iodine. To the resulting solution was added dropwise 0.21 g of methane disulfonylchloride $CH_2(SO_2Cl)_2$, and the solution was kept at 60° C. for 100 hours in an atmosphere of argon for reaction to proceed. After the reaction was complete, dry ethanol was added and the reaction product was concentrated to dryness. In this way there was obtained fullerene PPO having bis(chlorosulfonyl)methano group (—C(SO$_2$Cl)$_2$—) introduced into fullerene.

The resulting product was hydrolyzed with water so that sulfochloride group (—SO$_2$Cl) was converted into sodium salt of sulfonic acid group. The hydrolyzate was freed of salts having a small formula weight with the aid of permeable membrane. Thus there was obtained purified sodium sulfonate of fullerene PPO. This product was treated with ion exchange resin so that sodium ions were replaced by protons. Thus there was obtained 0.17 g of fullerene PPO sulfonic acid.

This sample was dissolved in dimethylformamide and the resulting solution was cast onto a gold electrode. After drying at 50° C. for 24 hours, there was obtained a desired film.

Example 4

This example as a modification of Example 3 demonstrates a film of fullerene PPO sulfonate in which polymer chains are partly crosslinked by bis-sulfonylimide groups (—SO$_2$—NH—SO$_2$—).

Fullerene PPO having sulfonyl chloride groups was synthesized in the same way as in Example 3. In tetrahydrofuran were dissolved 0.1 g of this fullerene PPO and 0.01 g of sodium bis(trimethylsilyl)amide. The resulting solution was cast onto a Teflon sheet in a glove box. The cast film was heated at 70° C. for 30 hours. During heating, the following reaction took place.

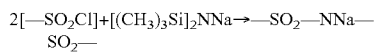
2[—SO$_2$Cl]+[(CH$_3$)$_3$Si]$_2$NNa→—SO$_2$—NNa—SO$_2$—

The cast film was peeled off from the Teflon sheet and then immersed in 1 M solution of sodium hydroxide so that unreacted sulfonylchloride groups were hydrolyzed. The film sample was immersed in 10% aqueous solution of hydrochloric acid so that sodium ions (Na$^+$) were replaced by hydrogen ions (H$^+$). This process converted sulfonic acid groups partly into bis-sulfonylimide groups (—SO$_2$—NH—SO$_2$—). Thus there was obtained a film of fullerene PPO sulfonate in which polymer chains are partly crosslinked by bis-sulfonylimide groups. The following reaction took place.

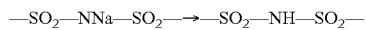
—SO$_2$—NNa—SO$_2$—→—SO$_2$—NH—SO$_2$—

Example 5

This example as a modification of Example 3 demonstrates a lithium ion conductor, with protons replaced by lithium ions (Li$^+$).

To 0.2 g of fullerene PPO sulfonic acid mentioned in Example 3 was added a small excess of 1 M solution of lithium hydroxide. After removal of salts by dialysis or washing, there was obtained 0.15 of lithium salt of fullerene PPO sulfonic acid.

This product was dissolved in dimethylformamide, and the resulting solution was mixed with 10% (by weight) of propylene carbonate. The mixture was cast onto a lithium electrode in a glove box to give a desired film.

Example 6

A polymer was prepared by condensation polymerization from 61,61-bis(p-hydroxyphenyl)methano-1,2-fullerene monomer according to the reaction flow diagram shown below. The same procedure as in Examples 2 and 3 was repeated to introduce sulfonic acid groups into this polymer. The fullerene-containing monomer as the starting material was prepared from p-tosylhydrazone derivative which had been synthesized from 4,4'-dimethoxybenzophenone in the same way as described by E. Ecamporrino in Macromolecules (1999), 32, 4273.

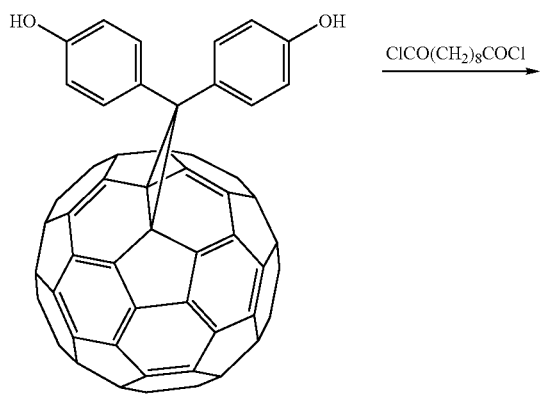

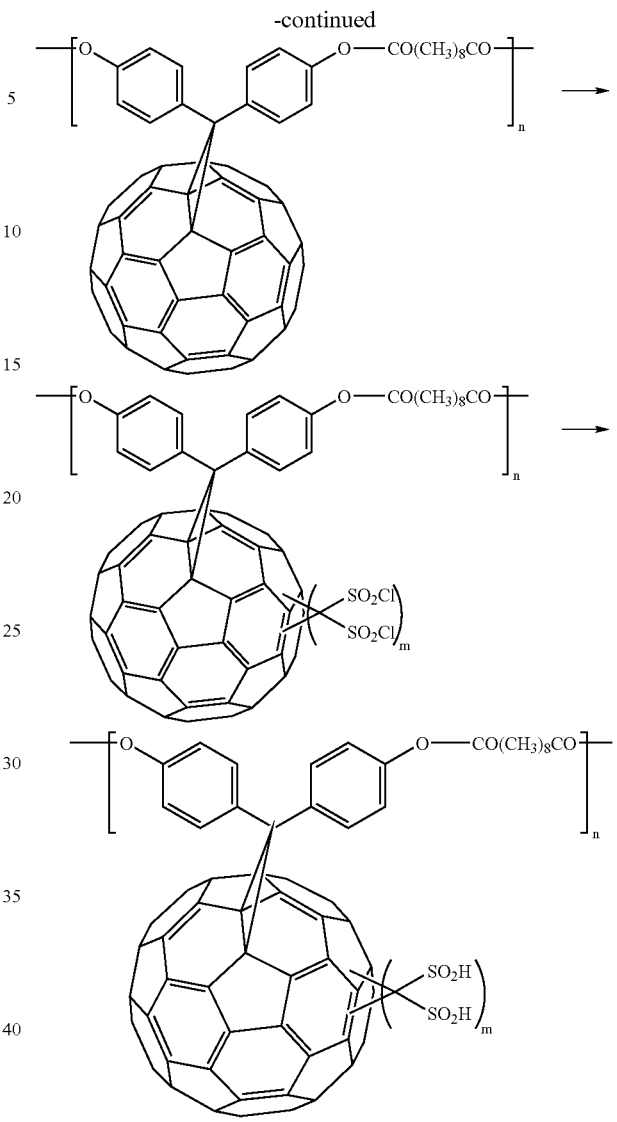

In 100 mL of dry nitrobenzene were dissolved 0.5 g of the monomer and 0.16 g of sebacoyl dichloride. The resulting solution was kept at 140° C. for 20 hours in an atmosphere of nitrogen so that reaction proceeded. The reaction product was freed of unreacted substances by washing. There was obtained 0.4 g of poly(4,4'-diphenyl-C$_{60}$ sebacate).

In 100 mL of tetrahydrofuran were dissolved 0.2 g of poly(4,4'-diphenyl-C$_{60}$ sebacate), 0.66 g of sodium hydride, and 0.46 g of iodine. To the resulting solution was added dropwise 0.28 g of methanedisulfonyl chloride (CH$_2$(SO$_2$Cl)$_2$). The resulting solution was kept at 60° C. for 100 hours in an atmosphere of argon so that reaction proceeded. After the reaction was complete, the reaction product was freed of unreacted substances by washing with ether and hexane. The washed reaction product was dissolved in ethanol and the resulting solution was concentrated to dryness.

The concentrated product was given water for conversion into sodium sulfonate by hydrolysis. After treatment with an ion exchange resin, there was obtained 0.15 g of sulfonated poly(4,4'-diphenyl-C$_{60}$ sebacate) which had undergone protonation.

This sample was formed into pellets by pressing.

Example 7

This example demonstrates a modification of Example 6 in which the sample is improved in film forming properties by incorporation with a binder.

In dimethylformamide were dissolved 0.1 g of sulfonated poly(4,4'-diphenyl-$C_{60}$ sebacate) mentioned in Example 6 and polycarbonate (bisphenol A type) having a molecular weight of about 50,000, as a binder. The resulting solution was cast onto a Teflon sheet, followed by drying at 50° C. for 24 hours. Thus there was obtained a self-supporting film.

Example 8

A polymer was prepared by condensation polymerization from 61,61-bis(p-methoxyphenyl)methano-1,2-fullerene after introduction of sulfonic acid groups according to the reaction flow diagram shown below.

In 100 mL of toluene were dissolved 0.1 g of 61,61-bis(p-methoxyphenyl)methano-1,2-fullerene (synthesized by the process mentioned by E. Ecamporrino in Macromolecules (1999), 32, 4273) and 0.35 g of iodine. To the resulting solution was added dropwise 0.21 g of methanedisulfonyl chloride ($CH_2(SO_2Cl)_2$), followed by reaction at 60° C. for 100 hours in an atmosphere of argon. Ethanol was added to complete reaction. The reaction product was washed to remove unreacted substances.

The crude product was dissolved in 100 mL of o-dichlorobenzene. To the solution was added 5 mL of 1 M dichloromethane solution of boron tribromide, followed by reaction at 0° C. for 24 hours in an atmosphere of nitrogen. After the reaction was complete, the reaction product was separated by hydrolysis with a sodium hydroxide solution. Sodium hydroxide was removed by passing the hydrolyzate through a silica gel column. Thus, there was obtained 0.4 g of 61,61-bis(p-methoxyphenyl)methano-1,2-fullerene into which sulfonic acid groups had been introduced.

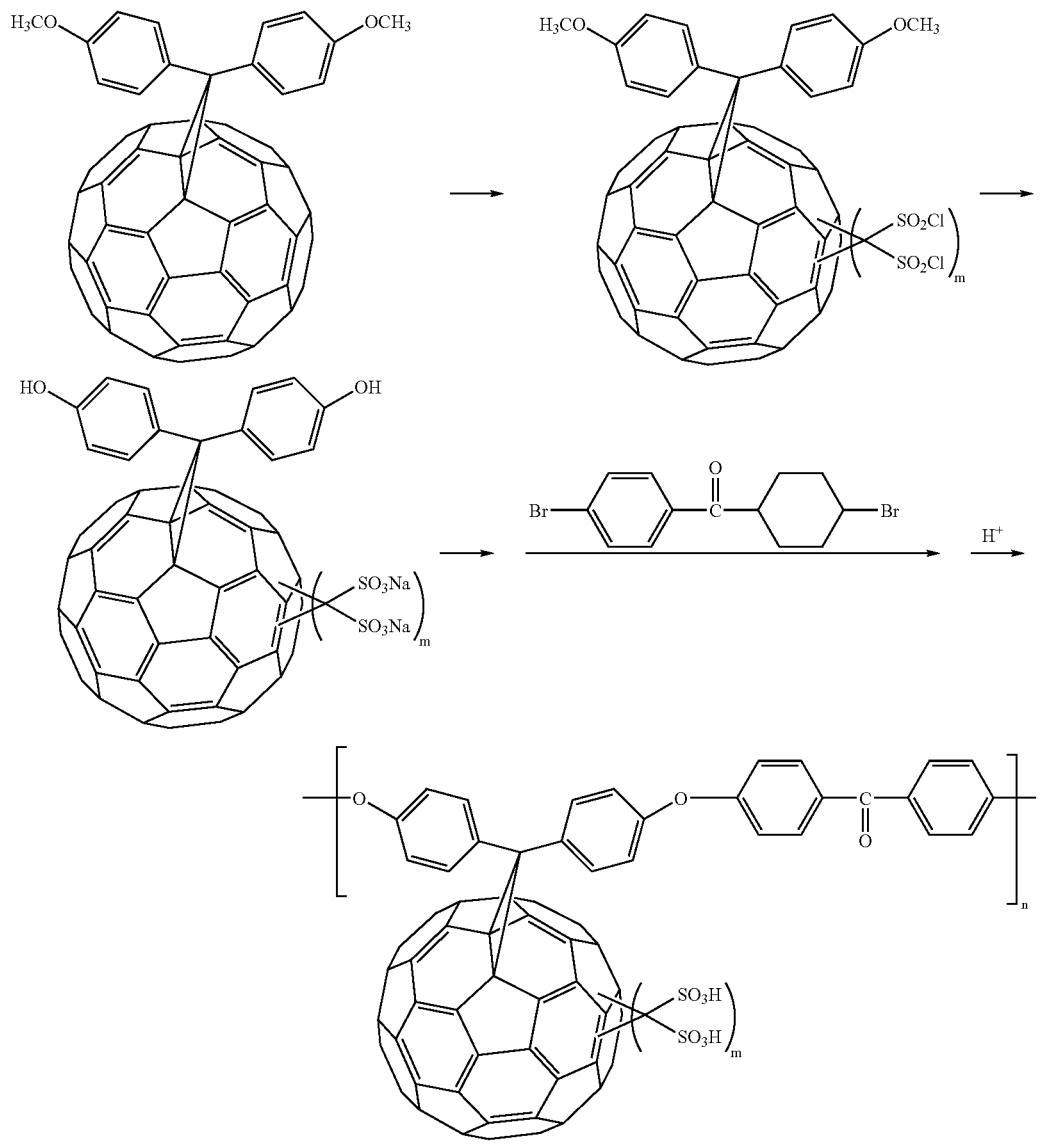

In 100 mL of dimethylacetamide were dissolved 0.4 g of the monomer (containing sulfonic acid groups), 0.1 g of 4,4'-dibromobenzophenone, 0.1 g of potassium carbonate, and 0.1 g of dimethylacetamide. Reaction was carried out at 160° C. for 20 hours. After the reaction was complete, the reaction product was precipitated by addition of methanol. Thus there was obtained a polyether ketone containing fullerene with sulfonic acid groups. The product was freed of low-molecular weight salt with the aid of permeable membrane, and the product was treated with 10% aqueous solution of hydrochloric acid for conversion into proton type. There was obtained 0.3 of the desired product.

This sample was dissolved in dimethylformamide, and the resulting solution was cast onto a gold electrode, followed by drying at 50° C. for 24 hours. Thus there was obtained a desired film.

Example 9

This example demonstrates a modification of Example 3 in which hydrogensulfate ester is introduced in place of sulfonic acid group.

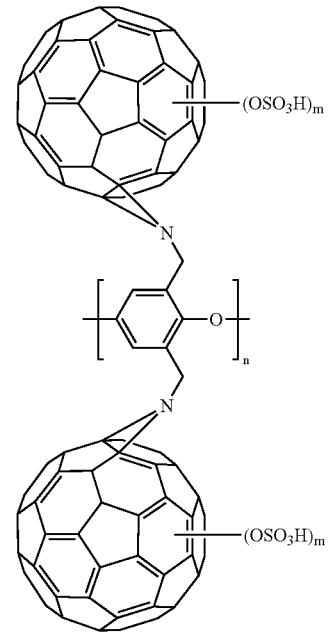

In 20 mL of 20% fuming sulfuric acid was dissolved 0.2 g of fullerene PPO mentioned in Example 3, followed by reaction at 60° C. for 3 days. After the reaction was complete, the reaction product was purified by precipitation from ether. Thus there was obtained 0.14 g of fullerene PPO containing hydrogensulfate ester groups. This sample was formed into a pellet by pressing.

Comparative Example 1

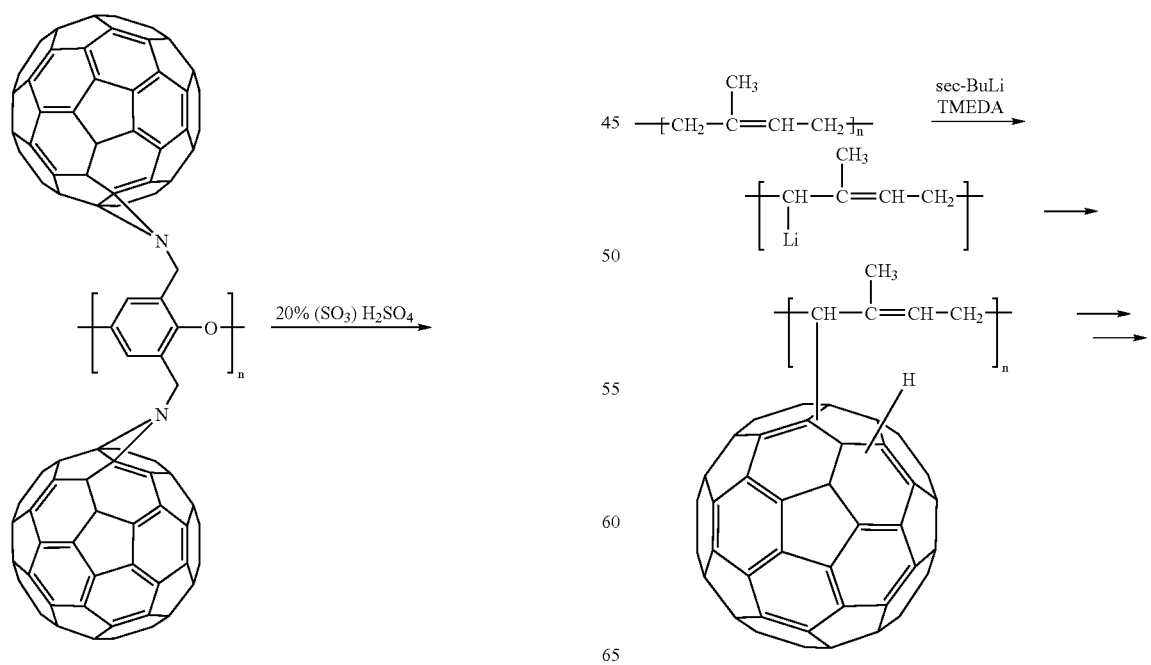

-continued

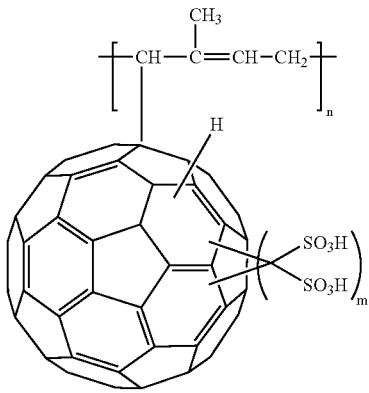

In 50 mL of cyclohexane was dissolved 0.5 g of polyisoprene with a molecular weight of 95000 in an atmosphere of argon. To the solution was added 6.0 mL of 1.3 M solution of sec-butyl lithium and 0.9 g of tetramethylethylenediamine (TMEDA).

Several minutes later, the solution turned into brown. Two hours later, 0.25 g of fullerene (dissolved in toluene) was added. Several hours later, methanol was added to suspend the reaction. The reaction product was separated from unreacted fullerene with the aid of tetrahydrofuran. Thus there was obtained 0.25 g of fullerene polyisoprene. This sample was found to contain about 50 wt % of fullerene.

In 100 mL of tetrahydrofuran were dissolved 0.2 g of fullerene polyisoprene, 0.5 g of sodium hydride, and 0.35 g of iodine. To the resulting solution was added dropwise 0.21 g of methanedisulfonyl chloride ($CH_2(SO_2Cl)_2$), followed by reaction at 60° C. for 100 hours in an atmosphere of argon.

After the reaction was complete, ethanol was added and the solution was concentrated to dryness.

The resulting product was dissolved in water for hydrolysis so that conversion into sodium sulfonate took place. The hydrolyzate was freed of salts having a small formula weight with the aid of permeable membrane. Thus there was obtained sodium fullerene-polyisoprenesulfonate. After treatment with ion exchange resin or 10% hydrochloric acid, there was obtained 0.15 g of protonated fullerene polyisoprenesulfonic acid.

This sample was dissolved in dimethylformamide, and the resulting solution was cast onto a gold electrode, followed by drying at 50° C. for 24 hours. Thus there was obtained a desired film.

Ionic conductivity of various polymers of fullerene (as ionic conductors) obtained in Examples 2 to 9

The samples of film and pellet obtained in the above-mentioned Examples and Comparative Example were tested for conductivity. The results are shown in Table 1. The change with time in protonic conductivity was measured in the following way. First, the sample was allowed to stand at 80% RH for 1 hour. Then the atmosphere was supplied with dry air to reduce the relative humidity to 30%. After standing in this atmosphere for 12 hours, the sample was tested for conductivity.

For comparison, commercially available "NAFION 117" film (0.007 inch thick, EW 1100) was used as such in Comparative Example 2. The sample of Example 4 was tested for lithium ion conductivity in a glove box containing less than 10 ppm of moisture.

TABLE 1

| | Protonic conductivity (S cm$^{-1}$) | | Retention of conductivity at low humidity (%) | Lithium ion conductivity (S cm$^{-1}$) |
|---|---|---|---|---|
| | 80 % RH ($\sigma_1$) | 30 % RH ($\sigma_2$) | $\sigma_2/\sigma_1 \times 100$ | $\sigma_3$ |
| Example 1 | $5.1 \times 10^{-3}$ | $7.0 \times 10^{-5}$ | 1.4 | |
| Example 2 | $2.9 \times 10^{-2}$ | $8.4 \times 10^{-4}$ | 2.8 | |
| Example 3 | $2.0 \times 10^{-2}$ | $4.5 \times 10^{-4}$ | 2.3 | |
| Example 4 | | | | $2.5 \times 10^{-5}$ |
| Example 5 | $9.5 \times 10^{-3}$ | $2.1 \times 10^{-4}$ | 2.2 | |
| Example 6 | $4.6 \times 10^{-3}$ | $6.1 \times 10^{-5}$ | 1.3 | |
| Example 7 | $1.3 \times 10^{-2}$ | $3.1 \times 10^{-4}$ | 2.4 | |
| Example 8 | $3.4 \times 10^{-2}$ | $1.3 \times 10^{-3}$ | 3.8 | |
| Comparative Example 1 | $7.3 \times 10^{-3}$ | $6.5 \times 10^{-5}$ | 0.89 | |
| Comparative Example 2 (Nafion) | $1.2 \times 10^{-2}$ | $8.3 \times 10^{-5}$ | 0.69 | |

Figure 6:
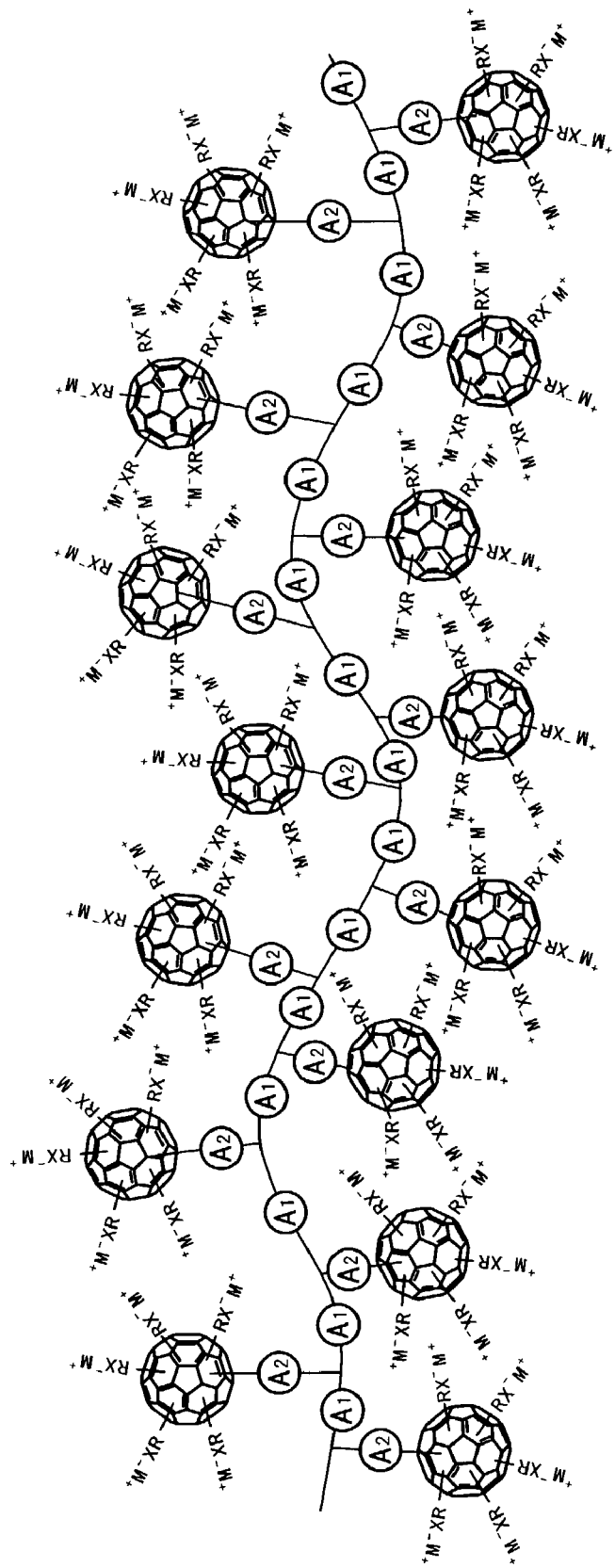
FIG. 6 is a schematic diagram showing the structure of the proton conducting polymer in Examples 2 to 9 according to an embodiment of the present invention.

FIG. 6 is a schematic diagram showing the structure of the polymer of fullerene as a protonic conductor represented by the formula (1) according to the present invention. In this diagram, $X^-M^+$ denotes the ion dissociating functional group. $A^1$ and $A^2$ in the main chain and side chain represent any one of chemical elements, such as N, P, O, S and/or the like introduced thereinto. Such elements absorb water or polar organic solvent, thereby forming a highly stable, continuous ion conducting layer, which contributes to ionic and protonic conductivity and its stability. This is apparent from Table 1.

A new polyimide-based material has recently appeared which has improved water retention owing to the interstices to hold water therein between molecular chains which are formed by introduction of bulky substituents into the polymeric electrolyte. The fullerene-based polymer effectively retains water and polar organic molecules in interstices between molecular chains on account of the bulkiness of fullerene itself and the introduction into the connecting part or the main chain of polar substituents highly compatible with water and polar organic solvent.

The ion-conducting channel does not stem from the phase separation by copious water but is formed by fullerene molecules per se having ion dissociating groups or by a minimum of water and polar compounds. This means that conductivity is not affected by dehydration or freezing.

The fact that fullerene molecules containing ion dissociating groups bind to a straight-chain polymer (thereby forming a polymer) leads to good solubility in a polar solvent, and this permits the product to be cast into thin film efficiently.

If the ratio of ion dissociating groups introduced is changed, it is possible to properly control the solubility in solvent.

If the protonic conductor is formed from simple fullerene molecules, it is necessary to chemically bond all the molecules (by crosslinking) in order to render the protonic conductor insoluble. By contrast, in the case of polymer, insolubilization is achieved by partial crosslinking of the polymer.

Figure 7:
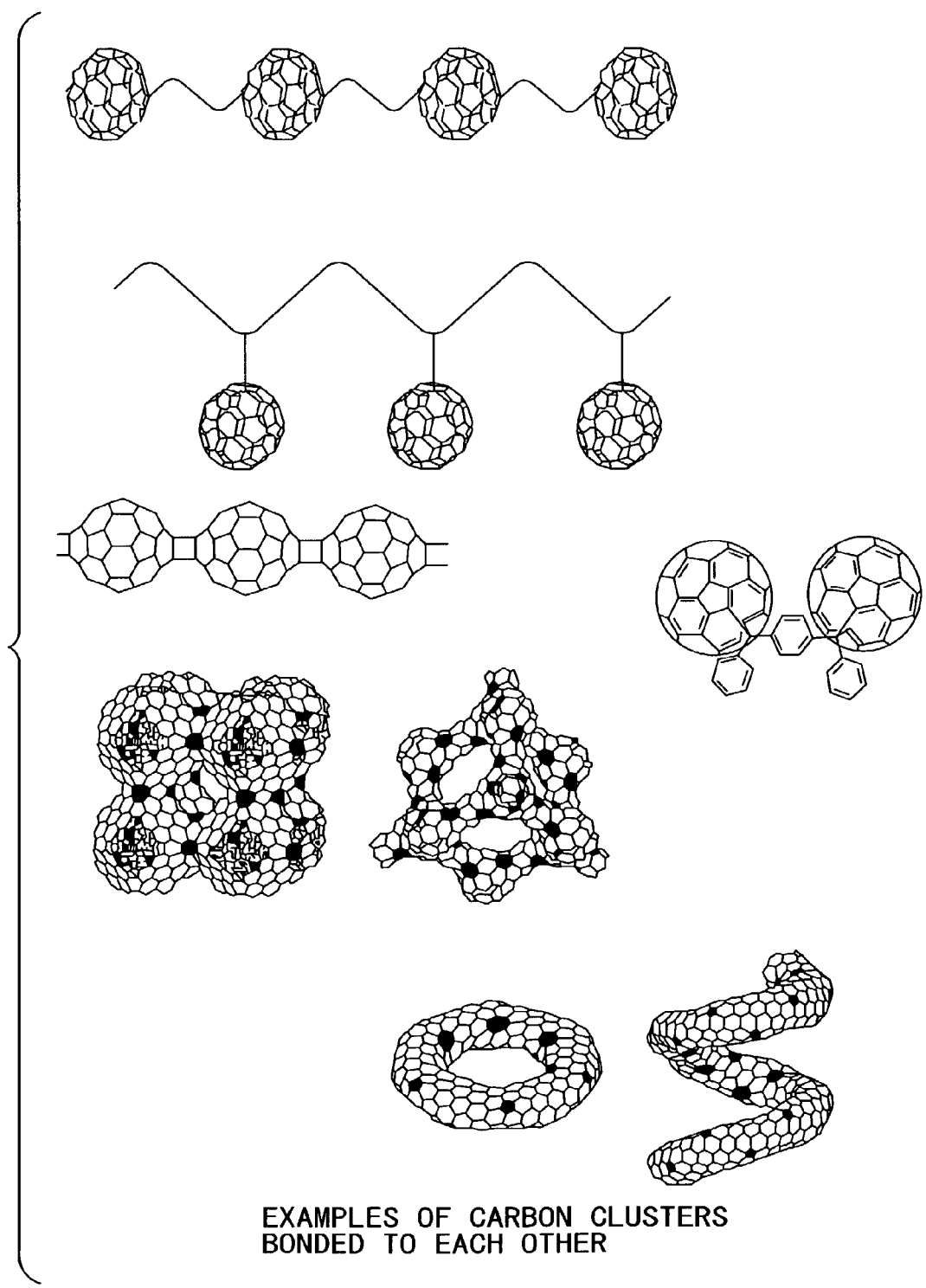
FIG. 7 is a schematic diagram showing examples of carbon clusters which are bonded to each other according to an embodiment of the present invention.

As shown in FIG. 7, the main part has the chain structure, and this contributes to good film-forming properties. The protonic conductor is compatible with a binder polymer which is similar in properties to the polymer of the main chain. This helps to form a mechanically strong film from a mixture with a binder polymer.

According to the present invention, it is essential that carbon clusters (as a parent material) form a polymer connected by hydrocarbon groups (such as methylene groups) or derivatives thereof and said carbon clusters have ion dissociating groups as substituents. Such substituents may be present in the group connecting said carbon clusters to each other.

The polymer of the present invention is much less water-soluble and much more chemically stable as compared with a derivative of carbon clusters alone. Therefore, said carbon clusters can include many ion dissociating functional groups. This contributes to a ionic conductor having improved ionic (protonic) conductivity.

The synthesis of said polymer can be accomplished readily by typical condensation, substitution, hydrolysis and/or the like. Therefore, the process of the present invention is suitable for mass production in high yields. Thus, it is possible to produce a water-insoluble proton conductor at a low cost without the necessity of using specialty-type fullerenes or insolubilizing the product by special operation.

Due to its improved ionic (protonic) conductivity, the ion conducting film according to an embodiment of the present invention can be utilized in a number of suitable ways, such as to construct an electrochemical device with improved and excellent performance.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An ionic conductor comprising a polymer comprising carbon clusters having one or more ion releasing group wherein the carbon clusters are bonded together via a spacer molecule.

2. The ionic conductor according to claim 1 wherein the spacer molecule includes a hydrocarbon radical selected from the group consisting of an aliphatic radical, an alicyclic radical, an aromatic radical and combinations thereof.

3. The ionic conductor according to claim 1 wherein the spacer molecule includes about 1 to about 20 carbon atoms.

4. The ionic conductor according to claim 1 wherein the spacer molecule includes a fluorine atom.

5. The ionic conductor according to claim 4 wherein the ion releasing group is selected from the group consisting of —OH and an atomic group containing —OH.

6. The ionic conductor according to claim 1 wherein the spacer molecule includes an ion dissociating group.

7. The ionic conductor according to claim 6 wherein the ion dissociating group is selected from the group consisting of hydroxyl group (—OH), hydrogensulfate ester group (—OSO$_2$OH), sulfonic acid group (—SO$_2$OH), carboxyl group (—COOH), phosphonic acid residue (—PO(OH)$_2$), dihydrogenphosphate ester group (—OPO(OH)$_2$) and combinations thereof.

8. The ionic conductor according to claim 1 wherein the carbon cluster includes a spherical carbon cluster molecule $C_n$ where n is an integer selected from the group consisting of 36, 60, 70, 76, 78, 80, 82, 84, and combinations thereof.

9. The ionic conductor according to claim 1 wherein the carbon cluster includes fullerene.

10. The ionic conductor according to claim 1 wherein the carbon cluster further includes an electron attractive functional group.

11. The ionic conductor according to claim 10 wherein the electron attractive functional group includes at least one chemical species selected from the group consisting of nitro group (—NO$_2$), carbonyl group (—CO—), carboxyl group (—COOH), nitrile group (—CN), halogenated alkyl group, halogen group and combinations thereof.

12. The ionic conductor according to claim 1 wherein the polymer is mixed with a binder.

13. The ionic conductor according to claim 12 wherein the binder is a material with low electron conductivity.

14. The ionic conductor according to claim 13 wherein the binder is at least one material selected from the group consisting of polyfluoroethylene, polyvinylidene fluoride, polyvinyl alcohol and combination thereof.

15. An ionic conductor comprising at least a polymer of carbon clusters having the formula (1):

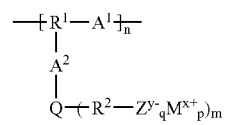

where $R^1$ includes a hydrocarbon group or a derivative thereof, $A^1$ and $A^2$ is selected from the group consisting of an element including any one of nitrogen, phosphorus, oxygen, and sulfur, and functional groups containing one or more of the elements wherein at least one of $A^1$ and $A^2$ are contained in the polymer; Q includes a residue of carbon cluster; $R^2$ includes a hydrocarbon group or a derivative thereof; $Z^{y-}_q M^{x+}_p$ includes an ion-dissociating group where x, y, p, and q are natural numbers such that px=qy; $M^{x+}$ includes a cation with a valence value of x; m represents the number of the ion-dissociating groups introduced into each of the carbon cluster residues; and n represents the degree of polymerization.

16. The ionic conductor according to claim 15 wherein the polymer does not include the $R^2$ group such that the ion-dissociating group ($-Z^{y-}_q M_{x+p}$) is bonded directly to the residue (Q) of the carbon cluster.

17. The ionic conductor as defined in claim 15, wherein the $-Z^{y-}$ includes at least one chemical species selected from the group consisting of sulfonic acid group anion (—SO$_3^-$), bis-sulfonylimide group anion (—SO$_2$—N$^-$—SO$_2$—), hydrogensulfate ester group anion (—OSO$_3^-$), carboxyl group anion (—COO$^-$), sulfonamide group anion (—SO$^2$NH$^{31}$ —), phosphonic acid residue anion (—PO$_3^{2-}$), and dihydrogenphosphate ester group anion (—OPO$_3^{2-}$).

18. The ionic conductor as defined in claim 15, wherein said $M^{x+}$ is selected from the group consisting of hydrogen ion (H$^+$), lithium ion (Li$^+$), sodium ion (Na$^+$), potassium ion (K$^+$), magnesium ion (Mg$^{2+}$), calcium ion (Ca$^{2+}$), strontium ion (Sr$^{2+}$), barium ion (Ba$^{2+}$) and combinations thereof.

19. The ionic conductor according to claim 15, wherein the carbon number of the $R^1$ and $R^2$ groups range from 1 to 20.

20. The ionic conductor according to claim 15, wherein the carbon cluster includes a spherical carbon cluster molecule $C_n$ where n is an integer selected from the group consisting of 36, 60, 70, 76, 78, 80, 82, 84 and combination thereof.

21. The ionic conductor according to claim 20, wherein the carbon cluster includes at least one of $C_{60}$ and $C_{70}$.

22. The ionic conductor according to claim 15 wherein the carbon cluster is fullerene.

23. The ionic conductor according to claim 15, wherein the carbon cluster further includes an electron attractive functional group.

24. The ionic conductor according to claim 23, wherein the electron attractive functional group includes at least one chemical species selected from the group consisting of nitro group (—$NO_2$), carbonyl group (—CO—), carboxyl group (—COOH), nitrile group (—CN), halogenated alkyl group, and halogen group.

25. The ionic conductor according to claim 15, which includes no less than about 5 mass % of the carbon cluster residue.

26. The ionic conductor according to claim 15, wherein at least one of the $R^1$ and $R^2$ groups include at least one chemical group selected from the group consisting of aliphatic hydrocarbon groups, alicyclic hydrocarbon groups, aromatic hydrocarbon groups, and derivatives thereof, and a functional group containing at least one element selected from the group consisting of nitrogen (N), oxygen (O), phosphorus (P), sulfur (S), fluorine (F), chlorine (Cl), bromine (Br), and iodine (I).

27. The ionic conductor according to claim 15, which is synthesized from a precursor polymer having a molecular weight ranging from about 1,000 to about 5,000,000.

28. The ionic conductor according to claim 15, which is synthesized from a monomer containing the carbon cluster residue by any one of homopolymerization and copolymerization with another monomer.

29. The ionic conductor according to claim 15, wherein the ionic conductor includes a partially crosslinked structure.

30. The ionic conductor according to claim 29, wherein the partially crosslinked structure is formed by radical reaction via irradiation with any one of light and a radical initiator.

31. The ionic conductor according to claim 29, wherein the polymer is crosslinked by reaction of a crosslinking agent with any one of a sulfonyl halide group and a hydroxyl group.

32. The ionic conductor according to claim 31, wherein the crosslinking agent includes any one of polyisocyanate, dihalogen, epoxy, diazide, dicarboxylic acid, and bistrimethylsilylamide.

33. The ionic conductor according to claim 15, wherein the polymer is gelled with the aid of a gelling agent.

34. The ionic conductor according to claim 33, wherein the gelling agent is selected from the group consisting of propylene carbonate, ethylene carbonate and dimethoxyethane.

35. The ionic conductor according to claim 15, wherein the ionic conductor is formed by casting a mixture of the polymer and a binder.

36. The ionic conductor according to claim 35, wherein the binder is selected from the group consisting of polycarbonate, polyvinylidene fluoride, polyphenylene oxide and combination thereof.

37. An electrochemical device comprising a first electrode, a second electrode and an ionic conductor disposed between the first electrode and the second electrode wherein the ionic conductor is selected from the group consisting of a plurality of carbon clusters having one or more ion releasing group wherein the carbon clusters are bonded together via a spacer molecule, and at least a polymer of carbon clusters having the formula (1):

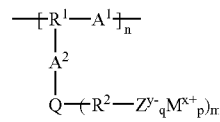

where $R^1$ includes a hydrocarbon group or a derivative thereof; $A^1$ and $A^2$ is selected from the group consisting of an element including any one of nitrogen, phosphorus, oxygen, and sulfur, and functional groups containing one or more of the elements wherein at least one of $A^1$ and $A^2$ are contained in the polymer; Q includes a residue of carbon cluster; $R^2$ includes a hydrocarbon group or a derivative thereof; $Z^{y-}_q M^{x+}_p$ includes an ion-dissociating group where x, y, p, and q are natural numbers such that px=qy; $M^{x+}$ includes a cation with a valence value of x; m represents the number of the ion-dissociating groups introduced into each of the carbon cluster residues; and n represents the degree of polymerization.

38. The ionic conductor according to claim 37 wherein the polymer does not include the $R^2$ group such that the ion-dissociating group (-$Z^{y-}_q M^{x+}_p$) is bonded directly to the residue (Q) of the carbon cluster.

39. The electrochemical device according to claim 37, wherein the electrochemical device includes a fuel cell.

* * * * *